US012321982B2

(12) United States Patent
Boscolo et al.

(10) Patent No.: US 12,321,982 B2
(45) Date of Patent: Jun. 3, 2025

(54) METHODS, SYSTEMS, AND ONE OR MORE NON-TRANSITORY COMPUTER-READABLE STORAGE MEDIA INCLUDING TEMPLATES TO GENERATE AUGMENTED REALITY CONTENT ITEMS THAT DISPLAY PRODUCT INFORMATION

(71) Applicant: Snap Inc., Santa Monica, CA (US)

(72) Inventors: Riccardo Boscolo, Culver City, CA (US); Stiven Deleur, Santa Monica, CA (US); Alona Kotliar, Los Angeles, CA (US); Jean Luo, Seattle, WA (US); Vincent Sung, Los Angeles, CA (US); Ashley Michelle Wayne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 144 days.

(21) Appl. No.: 17/402,277

(22) Filed: Aug. 13, 2021

(65) Prior Publication Data

US 2022/0101416 A1    Mar. 31, 2022

Related U.S. Application Data

(60) Provisional application No. 63/085,284, filed on Sep. 30, 2020.

(51) Int. Cl.
G06Q 30/00      (2023.01)
G06Q 30/0601    (2023.01)
G06V 20/20      (2022.01)

(52) U.S. Cl.
CPC ..... *G06Q 30/0643* (2013.01); *G06Q 30/0603* (2013.01); *G06V 20/20* (2022.01)

(58) Field of Classification Search
CPC ............... G06Q 30/0643; G06Q 30/0603
(Continued)

(56) References Cited

U.S. PATENT DOCUMENTS 9,978,125 B1 *   5/2018   Chang ................. G06F 16/5838
9,980,100 B1 *   5/2018   Charlton ................. G06T 11/60
(Continued)

FOREIGN PATENT DOCUMENTS

CN       116324853 A      6/2023
WO       2022072521       4/2022

OTHER PUBLICATIONS

Li, S. (2014). Assessing the user experience when using mobile augmented reality in advertising (Order No. 1565069). Available from ProQuest Dissertations & Theses Global. (1615894112). (Year: 2014). Retrieved from https://www.proquest.com/dissertations-theses/assessing-user-experience-when-using-mobile/docview/1615894112/se-2 (Year: 2014).*

(Continued)

*Primary Examiner* — Arielle E Weiner
(74) *Attorney, Agent, or Firm* — Schwegman Lundberg & Woessner, P.A.

(57) ABSTRACT

Augmented reality content item templates may be used to generate augmented reality content items that are executable to display content corresponding to products offered for purchase to users of a client application. The augmented reality content item templates may include regions that may be populated according to information related to individual products. In this way an augmented reality content item template may be used to generate augmented reality content items that are customized based on the information about the individual products. The augmented reality content item templates may be classified according to a classification system such that augmented reality content item templates corresponding to a respective classification may be used to generate augmented reality content items for products that also correspond to the respective classification.

20 Claims, 11 Drawing Sheets

(58) Field of Classification Search
USPC .......................................................... 705/27.2
See application file for complete search history.

(56) References Cited

U.S. PATENT DOCUMENTS

| | | | |
|---|---|---|---|
| 9,996,859 B1* | 6/2018 | Koshy | G06Q 30/0276 |
| 10,242,477 B1* | 3/2019 | Charlton | A63F 13/00 |
| 11,302,083 B1* | 4/2022 | Bhushan | G06F 9/451 |
| 2009/0222485 A1* | 9/2009 | Wassmann | G06F 16/951 |
| 2014/0325374 A1 | 10/2014 | Dabrowski et al. | |
| 2018/0053244 A1* | 2/2018 | Hendlin | G06Q 30/0621 |
| 2018/0210628 A1* | 7/2018 | McPhee | H04N 5/272 |
| 2018/0253900 A1* | 9/2018 | Finding | G06T 19/006 |
| 2019/0043106 A1* | 2/2019 | Talmor | G06N 20/00 |
| 2019/0043241 A1* | 2/2019 | Scheff | G06V 10/25 |
| 2020/0104909 A1 | 4/2020 | Hendlin et al. | |
| 2020/0210703 A1 | 7/2020 | Charlton et al. | |
| 2021/0073267 A1* | 3/2021 | Chopra | G06F 16/535 |

OTHER PUBLICATIONS

"International Application Serial No. PCT/US2021/052684, International Search Report mailed Jan. 20, 2022", 5 pgs.
"International Application Serial No. PCT/US2021/052684, Written Opinion mailed Jan. 20, 2022", 7 pgs.
"International Application Serial No. PCT/US2021/052684, International Preliminary Report on Patentability mailed Apr. 13, 2023", 9 pgs.

* cited by examiner

METHODS, SYSTEMS, AND ONE OR MORE NON-TRANSITORY COMPUTER-READABLE STORAGE MEDIA INCLUDING TEMPLATES TO GENERATE AUGMENTED REALITY CONTENT ITEMS THAT DISPLAY PRODUCT INFORMATION

PRIORITY CLAIM AND CROSS-REFERENCE TO RELATED APPLICATION

This patent application claims the benefit of priority to U.S. Provisional Patent Application No. 63/085,284, filed Sep. 30, 2020, entitled "TEMPLATES TO GENERATE AUGMENTED REALITY CONTENT ITEMS THAT DISPLAY PRODUCT INFORMATION", which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, client applications may also be used to execute augmented reality content items.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
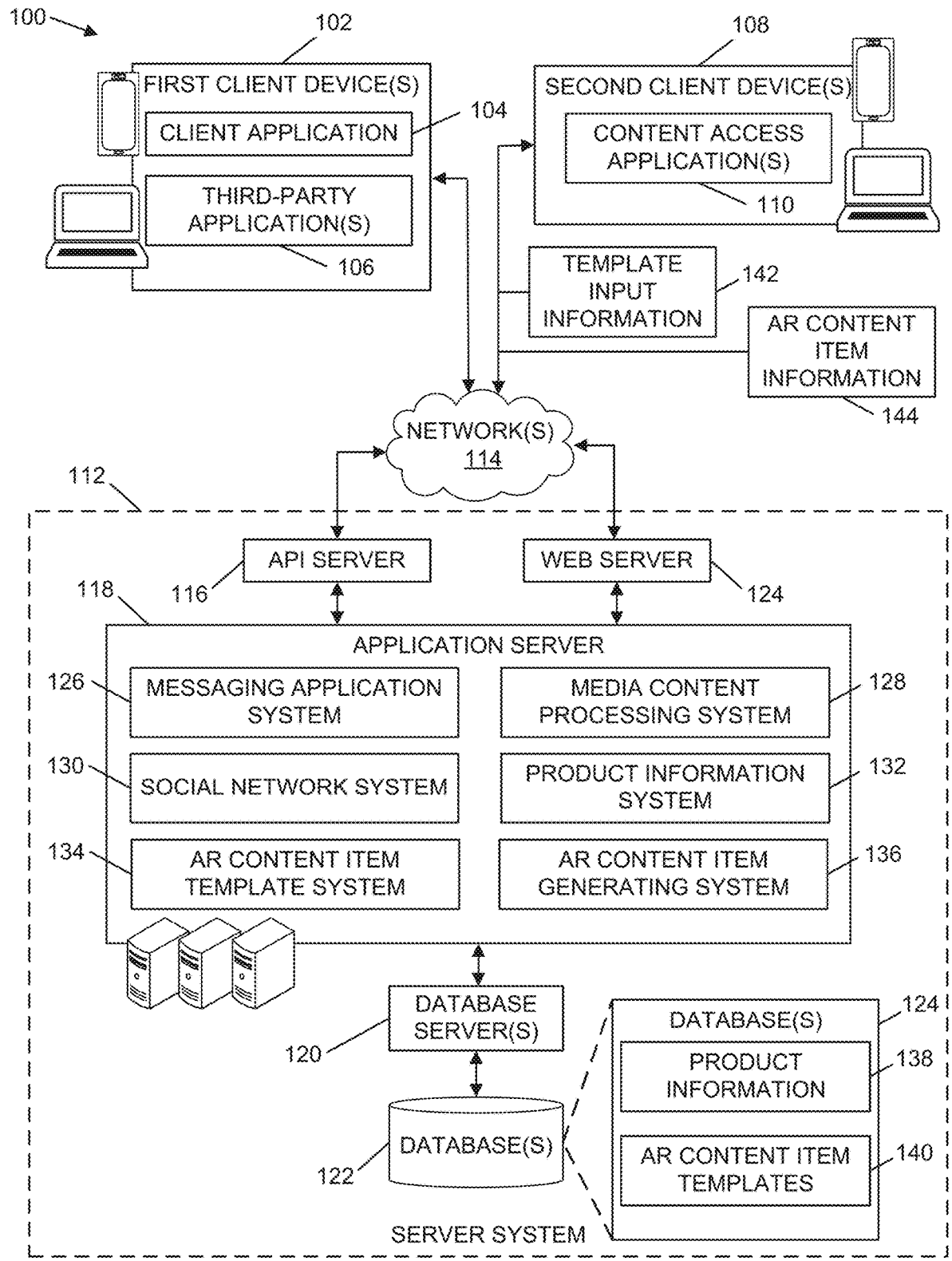
FIG. 1 is a diagrammatic representation of an architecture for exchanging data (e.g., messages and associated content) over a network, according to one or more example implementations.

Augmented reality content items may be used to modify user content that may be produced using a client application. For example, user content may include at least one of video content, image content, or audio content that is captured by one or more input devices of a client device, such as at least one of one or more cameras or one or more microphones. The modified user content may be shared with other users of the client application, such as via messages communicated via the client application or via social networking functionality of the client application. Users of client applications may also purchase items, such as goods or services, via the client applications. For example, client applications may include ecommerce functionality that enables user of the client application to purchase products from sellers of products, such as retailers, wholesalers, direct distributors, manufacturers, and the like.

In existing systems, information related to products or services is typically displayed to users of client applications as advertisements. The advertisements may be presented separately from the user content. For example, user content may be presented in a portion of a user interface and one or more advertisements may be presented in one or more additional portions of the user interface. Additionally, the user content may be replaced by one or more advertisements for a period of time. Thus, information about products or services is not typically incorporated into user content.

Augmented reality content items may be executable to display information about products or services offered for purchase by entities in relation to user content. As a result, augmented reality content items may provide a customized experience for users of client applications with respect to user content generated via the client application and content incorporated into the augmented reality content items. However, for many entities that offer products for purchase, the creation of augmented reality content items may be an inefficient process and the entities may be unable to provide the resources to generate augmented reality content items that incorporate information about products offered by the entities. As used herein, the term "product" may refer to an item that is available for acquisition by an acquirer, such as a buyer. A product may refer to a physical good, an electronic item, a service, or one or more combinations thereof.

The systems, methods, techniques, instruction sequences, architectures, and computing machine program products described herein are directed to a customized experience for entities to generate augmented reality content items that incorporate content related to products offered for acquisition by the entities. The entities may include one or more individuals, businesses, educational institutions, non-profit organizations, or any individual or organization that offers products for acquisition. The products may be offered for acquisition via a client application, such as using ecommerce functionality. In additional scenarios, the products may be offered for acquisition at a physical location.

In one or more examples, the systems, methods, instruction sequences, architectures, and computing machine program products described herein may provide a guided experience by which entities may generate augmented reality content items that incorporate information related to products offered for purchase by the entities. In various examples, augmented reality item templates may be accessible to entities that may be used to generate augmented reality content items that present information about products offered by the entities. The templates may be related to features of products for which information may be presented by the augmented reality content items. One or more templates provided to an entity may be based on information obtained from the entity indicating features of the entity or features of products offered for purchase by the entity. For example, one or more templates may correspond to products offered for purchase by entities in a given industry or category. To illustrate, one or more first augmented reality content item templates may correspond to products offered for purchase by retail entities, while one or more second augmented reality content item templates may correspond to products offered for purchase by food and beverage entities.

In various examples, an augmented reality content item template may include one or more regions that may be populated using content that corresponds to information of a product where the information is obtained from an entity offering the product for purchase.

In this way, the template may indicate a location where a piece of information about a product may be presented in relation to user content. Additionally, the template may indicate a type of information that may be presented at a region of the template, such as a product name, a slogan, a brand name, graphical content, image content, animation content, video content, one or more combinations thereof, and the like. In one or more examples, the template may provide a preview of an executed augmented reality content item in relation to information about a product offered for purchase by the entity. The information used to populate one or more regions of the template may be obtained from a catalog of information about products offered for purchase by the entity. In one or more implementations, the information used to populate the one or more regions of the template may be based on features of the products offered for purchase by the entity. For example, a first set of information may be used to populate one or more regions of the template for retailers selling clothing items and a second set of information may be used to populate the one or more regions of the template for restaurants.

Accordingly, the systems, methods, instruction sequences, architectures, and computing machine program products described herein may enable entities to efficiently generate augmented reality content items that may present information related to products offered by the entities. For example, the selection of augmented reality content item templates for an entity may be guided in a customized manner based on features of the entities or the products offered for purchase by the entity. As a result, the resources dedicated to generating augmented reality content items by entities may be reduced and the quality of the content available to users of the client application may be improved. Additionally, by providing augmented reality content items that present content related to products offered for purchase by the entities, interactions and impressions between users of the client application with respect to content of the entities is more likely to increase.

FIG. 1 is a diagrammatic representation of an architecture 100 for exchanging data (e.g., messages and associated content) over a network. The architecture 100 may include multiple first client devices 102. The first client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each first client device 102 may host a number of applications, including a client application 104 and one or more third-party applications 106. Respective first client devices 102 may be operated by one or more users of the client application 104. A user may use the client application 104 to create user content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

The architecture 100 may also include second client devices 108. The second client devices 108 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each second client device 108 may host a number of applications, including one or more content access applications 114. A content access application 114 may be used to access content from one or more sources. In various examples, the content access application(s) 114 may include one or more browsing applications, such as a web browser. In one or more examples, the second client devices 108 may be operated by one or more representatives of an entity that offers at least one of products or services for purchase.

Each instance of the client application 104 is able to communicate and exchange data with at least one of another instance of the client application 104, one or more third-party applications 106, or a server system 112. The data exchanged between instances of the client applications 104, between the third-party applications 106, and between instances of the client application 104 and the server system 112 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 112.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 112 provides server-side functionality via one or more networks 114 to the client application 104. The server system 112 may be a cloud computing environment, according to some example implementations. For example, the server system 112, and one or more servers associated with the server system 112, may be associated with a cloud-based application, in one illustrative example. In one or more implementations, the client device 102 and the server system 112 may be coupled via the one or more networks 114.

The server system 112 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 112, the location of functionality either within the client application 104 or the server system 112 is a design choice. For example, it may be technically preferable to initially deploy certain technology and functionality within the server system 112, but to later migrate this technology and functionality to the client application 104 where a client device 102 has a sufficient processing capacity.

The server system 112 includes an Application Programming Interface (API) server 116 that is coupled to, and provides a programmatic interface to, an application server 118.

The application server 118 is communicatively coupled to a database server 120 that facilitates access to one or more databases 122. The one or more databases 122 may store data associated with information processed by the application server 118. The one or more databases 122 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 122 may further store information related to third-party servers, client devices 102, client applications 104, users, third-party applications 106, and so forth.

The API server 116 receives and transmits data (e.g., commands and message payloads) between client devices 102 and the application server 118. Specifically, the Application Program Interface (API) server 116 provides a set of interfaces (e.g., routines and protocols) that can be called or queried by the client application 104 in order to invoke functionality of the application server 118. The Application Program Interface (API) server 116 exposes various functions supported by the application server 118, including account registration, login functionality, the sending of messages, via the application server 118, from one instance of the client application 104 to another instance of the client application 104, the sending of media files (e.g., images, audio, video) from a client application 104 to the application server 118, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 112 may also include a web server 124. The web server 124 is coupled to the application servers 118, and provides web-based interfaces to the application servers 118. To this end, the web server 124 processes incoming network requests over the Hypertext Transfer Protocol (HTTP) and several other related protocols.

The application server 118 hosts a number of applications and subsystems, including a messaging application system 126, a media content processing system 128, a social network system 130, a product information system 132, an augmented reality (AR) content item template system 134, and an AR content item generating system 136. The messaging application system 126 implements a number of message processing technologies and functions, particularly related to the aggregation and other processing of content (e.g., textual and multimedia content) included in messages received from multiple instances of the client application 104. For example, the messaging application system 126 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 126 may aggregate text and media content from multiple sources into collections of content. These collections are then made available, by the messaging application system 126, to the client application 104. Other processor- and memory-intensive processing of data may also be performed server-side by the messaging application system 126, in view of the hardware requirements for such processing.

The media content processing system 128 is dedicated to performing various media content processing operations, typically with respect to images, audio, or video received within the payload of a message or other content item at the messaging application system 126. The media content processing system 128 may access one or more data storages (e.g., the database(s) 122) to retrieve stored data to use in processing media content and to store results of processed media content.

The social network system 130 supports various social networking functions and services, and makes these functions and services available to the messaging application system 126. To this end, the social network system 130 maintains and accesses an entity graph within the database(s) 122. Examples of functions and services supported by the social network system 130 include the identification of other users of the client application 104 with which a particular user has relationships or is "following", and also the identification of other entities and interests of a particular user. The social network system 130 may access location information associated with each of the user's friends or other social network connections to determine where they live or are currently located geographically. In addition, the social network system 130 may maintain a location profile for each of the user's friends indicating the geographical location where the user's friends live.

The product information system 132 may obtain information about products offered for purchase by one or more entities. In one or more examples, the product information system 132 may extract information from one or more data storage devices of the one or more entities that is related products offered for purchase by the one or more entities. In various examples, the product information system 132 may parse one or more databases of the one or more entities in relation to one or more criteria to obtain information corresponding to products offered for purchase by the one or more entities. In one or more additional examples, the product information system 132 may generate one or more user interfaces that include one or more user interface elements that may capture information related to products offered for purchase by the one or more entities. In one or more implementations, the product information system 132 may obtain additional information corresponding to entities that offer products for purchase, such as one or more logos, branding information, contact information, location information, information descriptive of the one or more entities, one or more combinations thereof, and the like.

The product information system 132 may store the information obtained related to products from one or more entities as product information 138. The product information 138 may include pricing information, description information, identification information, review information, ratings information, information indicating features of products, image content corresponding to products, video content corresponding to products, audio content corresponding to products, shipping options information, one or more combinations thereof, and so forth.

In one or more examples, the product information system 132 may store the product information 138 according to features of the products offered for purchase by one or more entities. For example, the product information system 132 may be stored in relation to features that may be used to classify one or more respective products. In various examples, classifications for one or more products may correspond to augmented reality content item templates that may incorporate information related to the one or products. In one or more illustrative examples, the product information system 132 may store information about products according to an industry related to the products, such as the food and beverage industry, the cosmetics and personal products industry, the clothing industry, the automobile industry, the home appliance industry, the electronic device industry, the sporting goods industry, one or more combinations thereof, and the like. Storing portions of the product information 138 that correspond to respective products according to industry or other features of the products, may enable the information about a respective product to be retrieved efficiently and enable one or more augmented reality content item templates to be identified for the product efficiently. In one or more implementations, the product information 138 may store one or more product catalogs for one or more respective entities. For a given entity, the one or more product catalogs may be arranged according to features of the products included in at least one product catalog, such as one or more classifications related to products included in the one or more product catalogs.

In various examples, the product information system 132 may analyze information obtained from an entity about one or more products offered for purchase by the entity to determine one or more features of the one or more products that may be used to classify the one or more products. In one or more illustrative examples, the product information system 132 may analyze information about products obtained from one or more entities to identify one or more keywords of at least one classification included in the information about the products. In response to identifying one or more keywords of a classification included in information about a product, the product information system 132 may associate the product with the classification. In one or more additional examples, the product information system 132 may determine a classification for a product based on input obtained from an entity indicating a classification of the product. To illustrate, the product information system 132 may generate a user interface that includes one or more user interface elements to capture information indicating a classification of a product offered for purchase by the entity. In one or more examples, the information indicating the classification of the product may include an identifier of the classification, such as "Health and Fitness", or one or more keywords corresponding to the classification, such as "exercise", "gym", or "workout".

The AR content item template system 134 may determine one or more AR content item templates 140 to provide in relation to one or more products offered for purchase by one or more entities. The AR content item templates 140 may be used to generate augmented reality content items that are executable to display information about products offered for purchase by one or more entities. The AR content item templates 140 may indicate one or more regions that include product information 138 related to a product within a user interface, where the user interface also includes user content generated by the client application 104. In various examples, the AR content item templates 140 may also indicate categories of information that is to be displayed in respective regions. For example, the AR content item templates 140 may indicate a location of a region that is to include an identifier of an entity offering a product for purchase and a location of an additional region that is to include an identifier of the product. Further, the AR content item template 140 may indicate another region that is to include graphical content related to the product. In one or more examples, the content included in a respective region indicated by AR content item templates 140 may include static content or dynamic content. To illustrate, the content included in a region of an AR content item template 140 may include at least one of image content, video content, audio content, animation content, or text content. In one or more illustrative examples, the content included in one or more regions of an AR content item template 140 may be displayed as an overlay with respect to user content generated by the client application 104.

The AR content item templates 140 may each be associated with one or more classifications of products. For example, one or more first AR content item templates 140 may be associated with a first classification of products and one or more second AR content item templates 140 may be associated with a second classification of products. In this way, one or more entities offering products for purchase related to the first classification may utilize one or more AR content item templates 140 associated with the first classification to generate augmented reality content items that present information related to the products corresponding to the first classification. In addition, one or more entities offering products for purchase related to the second classification may utilize one or more AR content item templates 140 associated with the second classification to generate augmented reality content items that present information related to the products corresponding to the second classification. In one or more illustrative examples, an AR content item template 140 having a first classification may be used to generate augmented reality content items that are executable to present information related to food and beverage products and an additional AR content item template 140 having a second classification may be used to generate augmented reality content items that are executable to present information related to consumer packaged goods.

In one or more examples, the AR content item template system 134 may determine one or more AR content item templates 140 to provide to an entity with respect to one or more products based on template input information 142. The template input information 142 may be obtained via one or more user interfaces accessible to the entity using one or more content access applications 110 executed by one or more second client devices 108. For example, an entity may operate a second client device 108 to access an electronically accessible site, such as a website, via a content access application 110 to provide information that may be used to obtain the template input information 142. To illustrate, the AR content item template system 134 may generate one or more user interfaces that include user interface elements to capture the template input information 142 that may be used to identify one or more AR content item templates 140 that may be used to generate one or more AR content items for the entity. In various examples, the template input information 142 may indicate one or more products of the entity, one or more features of one or more products of the entity, one or more classifications of one or more products of the entity, or one or more combinations thereof.

The AR content item template system 134 may analyze the template input information 142 with respect to information related to individual augmented reality content item templates included in the AR content item templates 140. The analysis of the template input information 142 may determine a classification of a product for which an augmented reality content item is to be generated. The AR content item template system 134 may then determine an AR content item template 140 that may be used to generate an augmented reality content item for the product based on the classification. For example, the AR content item template system 134 may determine that the template input information 142 includes an identifier of a product offered for purchase by an entity. The AR content item template system 134 may then analyze the identifier of the product with respect to the product information 138 that is associated with the product to determine a classification for the product. The AR content item template system 134 may then identify, based on the classification, one or more content item templates 140 that may be used to generate an augmented reality content item for the product.

In various examples, after determining an AR content item template 140 to utilize to generate an augmented reality content item for a product, the AR content item template system 134 may produce the augmented reality content item. To illustrate, the AR content item template system 134 may determine information to be presented with respect to individual regions included in an AR content item template 140 that is to be used to produce the augmented reality content item. In one or more examples, the AR content item template system 134 may determine that an identifier of a product is to be included in a region of an AR content item template 140 used to generate an augmented reality content item for the product. The AR content item template system 134 may analyze the product information 138 to determine the identifier of the product. In one or more scenarios, the AR content item template system 134 may generate an augmented reality content item for the product using the AR content item template 140 where the augmented reality content item includes the identifier and associates the identifier with the respective region or includes a storage location identifier, such as a uniform resource location, for the identifier with respect to the respective region. In a similar manner, the AR content item template system 134 may cause other information for the product to be associated with specified regions of the AR content item template 140 related to the product with respect to an augmented reality content item generated by the AR content item template system 134 for the product.

In one or more illustrative examples, the AR content item generating system 136 may receive AR content item information 144 indicating an identifier of a product offered by an entity for purchase by one or more users of the client application 104. The AR content item generating system 136 may receive the AR content item information 144 from the one or more second client devices 108. The AR content item generating system 136 may obtain information about the product from the product information 138 using the identifier included in the AR content item information 144. The AR content item generating system 136 may determine a classification of the product based on the information about the product included in the AR content item information 144. To illustrate, the AR content item generating system 136 may determine that the product corresponds to a consumer packaged goods classification. Based on the classification for the product, the AR content item generating system 136 may determine an AR content item template 140 that corresponds to the classification. In addition, based on the classification of the product, the AR content item generating system 136 may identify information included in the product information 138 that may be used to populate one or more regions included in the AR content item template 140. For example, the AR content item generating system 136 may determine that a region of the AR content item template 140 is to be populated by a logo of an entity offering the product for purchase and the augmented reality content item generating system 136 may obtain the logo from the product information 138. The augmented reality content item generated by the AR content item generating system 136 may then include data corresponding to the logo or a storage location of the logo such that executing the augmented reality content item related to the product may cause the logo of the entity to be displayed in the region indicated in the AR content item template 140. The augmented reality content generating system 136 may also generate the augmented reality content item to include additional content that is to be presented in response to execution of the augmented reality content item, such as a name of the product, an animated graphic related to the product, image content corresponding to the product, a slogan related to the product, one or more combinations thereof, and so forth.

Figure 2:
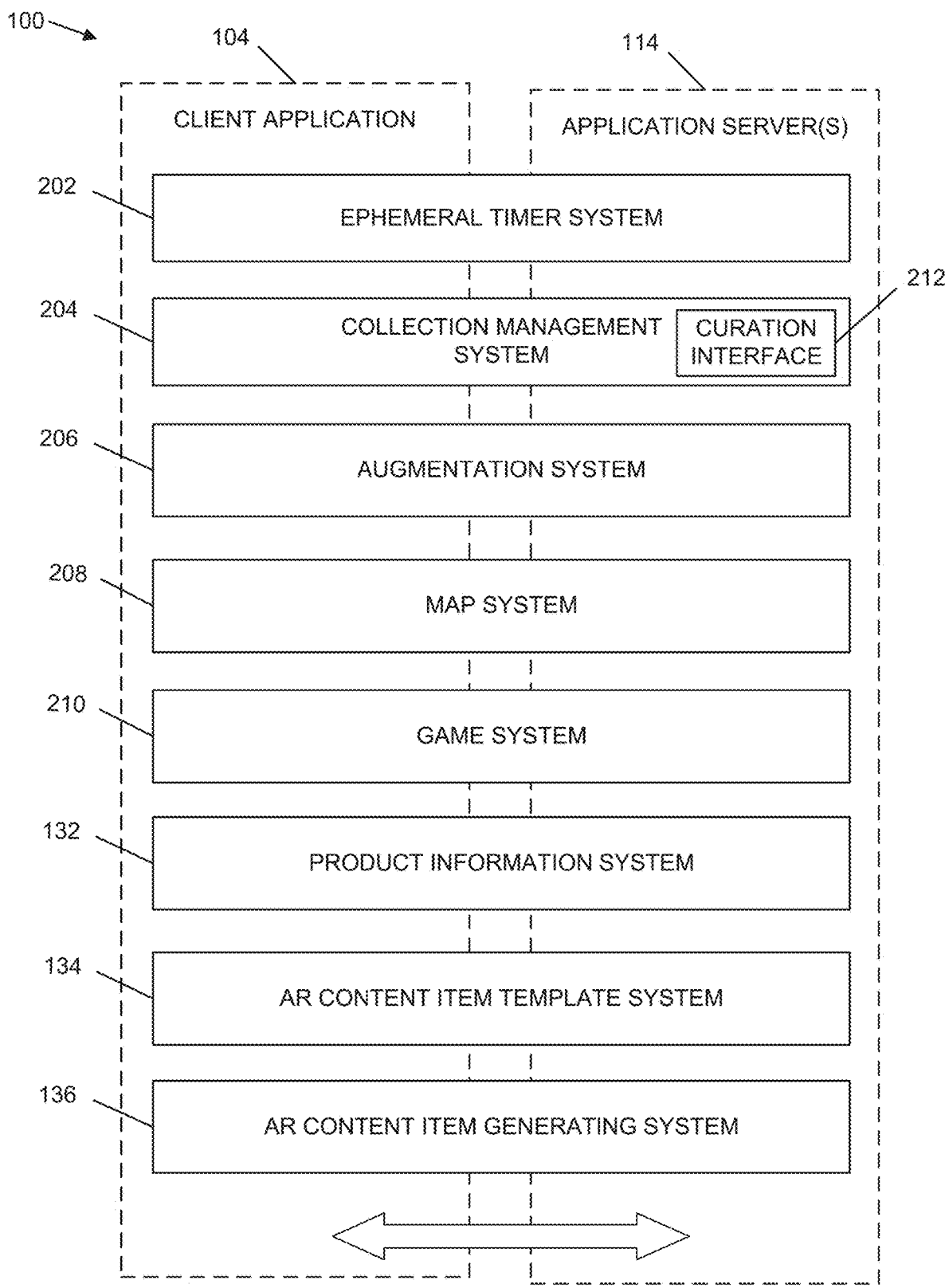
FIG. 2 is a diagrammatic representation of a system, in accordance with some examples, that may have both client-side and server-side functionality.

FIG. 2 is a block diagram illustrating further details regarding the server system 112, according to some examples. Specifically, the server system 112 is shown to comprise the client application 104 and the application servers 118. The server system 112 embodies a number of subsystems, which are supported on the client-side by the client application 104 and on the sever-side by the application servers 118. These subsystems include, for example, an ephemeral timer system 202, a collection management system 204, an augmentation system 206, a map system 208, a game system 210, the product information system 132, the AR content item template system 134, and the AR content item generating system 136.

The ephemeral timer system 202 is responsible for enforcing the temporary or time-limited access to content by the client application 104 and the messaging application system 126. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 112. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 122 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 112 from a specific geographic location may be displayed within the context of a map at that particular location to "friends" of a specific user on a map interface of the client application 104. A user can furthermore share his or her location and status information (e.g., using an appropriate status avatar) with other users of the server system 112 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 112. The server system 112 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The product information system 132 may obtain information corresponding to one or more products offered by one or more entities for purchase by one or more users of the client application 104. The information may include one or more product catalogs of the one or more entities. In addition, the product information system 132 may store the information related to the one or more products with respect to a classification system. The classification system may include a number of classifications and each classification included in the classification system may indicate one or more features of products included in the respective classification. In various examples, the product information system 132 may store information related to the one or more products in a manner that facilitates efficient retrieval of information related to products for identifying augmented reality content item templates related to products and retrieval of information used to populate one or more regions of the augmented reality content item templates.

The AR content item template system 134 may generate augmented reality content item templates that correspond to classifications included in the classification system. In various examples, the augmented reality content item template system 134 may determine one or more templates that correspond to a respective product for which an augmented reality content item is to be generated. The AR content item template system 134 may determine an augmented reality content item template associated with a product based on one or more features of the product with respect to one or more features of a number of augmented reality content item templates. For example, the AR content item template system 134 may determine a classification of the product based on information obtained by the product information system 132 and determine one or more augmented reality content item templates that correspond to the classification.

The AR content item generating system 136 may generate augmented reality content items for products using templates identified by the AR content item template system 134 and based on information obtained by the product information system 132. In one or more examples, the AR content item generating system 136 may determine one or more regions of an augmented reality content item template for which information is to be populated. For each region, the AR content item generating system 136 may obtain information used to populate the region from a product information data store. In various examples, individual regions of an augmented reality content item template may indicate product feature identification information that includes an identifier of features of a product or an identifier of a type of information used to populate an individual region. The AR content item generating system 136 may utilize the product feature identification information to parse a product information data store for information related to a respective product that is to be used to populate the one or more regions of the augmented reality content item template that corresponds to the product. The AR content item generating system 136 may then generate an augmented reality content item that includes a data package having computer-executable instructions and information used to populate regions of the augmented reality content item template. In various examples, the data package may include storage location identifiers corresponding to the information used to populate the one or more regions of the augmented reality content item template. The computer-executable instructions included in the data package may be executable to display content related to the product including content included in the one or more regions of the augmented reality content item template used to generate the augmented reality content item.

Figure 3:
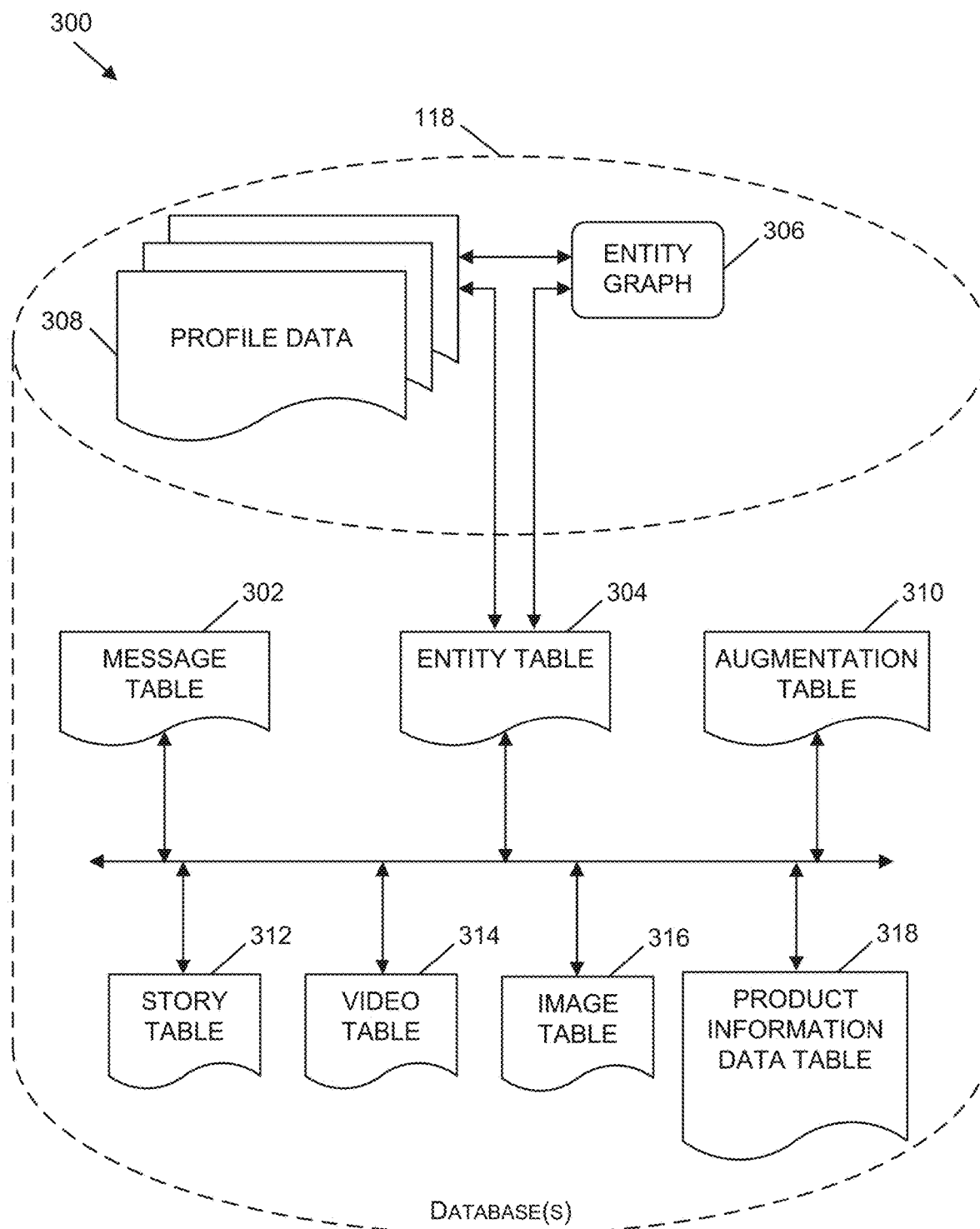
FIG. 3 is a schematic diagram illustrating data that may be stored in a database of a server system, according to one or more example implementations.

FIG. 3 is a schematic diagram illustrating data structures 300 which may be stored in the database(s) 122 of the server system 112, according to one or more example implementations. While the content of the database(s) 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 112 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302.

Similarly, the image table 316 stores image data associated with messages for which message data is stored in the entity table 304. The entity table 304 may associate various augmentations from the augmentation table 310 with various images and videos stored in the image table 316 and the video table 314.

The database(s) 122 may also store a product information data table 318. The product information data table 318 may include information that corresponds to a number of products offered by a number of entities for purchase by users of the client application 104. For an individual product of the number of products, the product information data table 318 may include an identifier of the product, a classification of the product, pricing information of the product, a description of the product, reviews of the product, a rating of the product, image content related to the product, video content related to the product, text content related to the product, audio content related to the product, shipping information related to the product, an identifier of a manufacturer of the product, one or more combinations thereof, and the like. In various examples, the product information data table 318 may store information about products that may be used to identify one or more augmented reality content item templates that may be used to generate one or more augmented reality content items related to the products. Additionally, the product information data table 318 may store information that may be used to populate regions of augmented reality content item templates that may be specific to an individual product.

Figure 4:
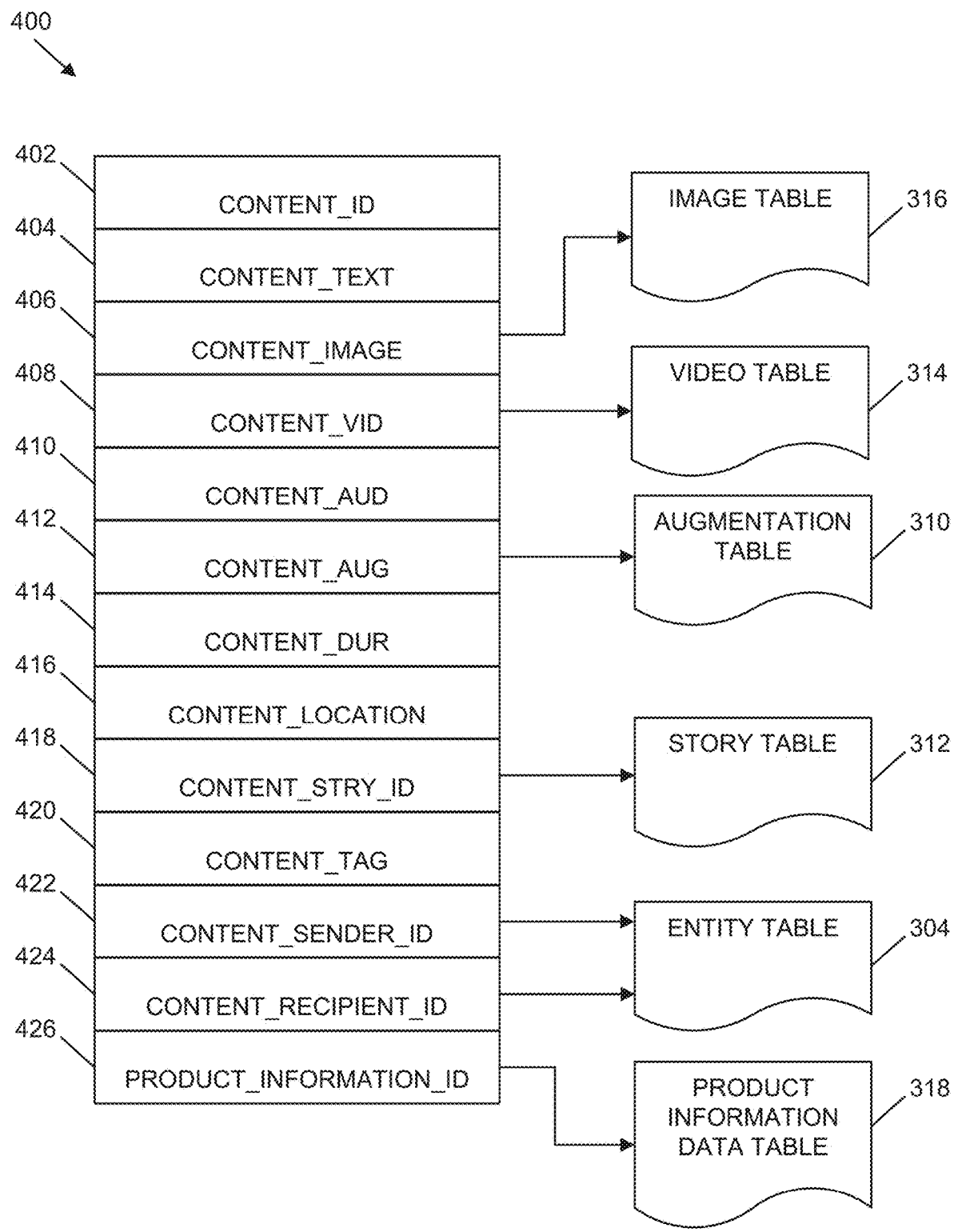
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 112. In situations where the content 400 includes a message, the content 400 may be used to populate the message table 302 stored within the database(s) 122 and accessible by the application server 118. In one or more implementations, the content 400 may be stored in memory as "in-transit" or "in-flight" data of at least one of client devices 102 or the application server 118. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

product information identifier 426: an identifier included in user content that indicates information that is to be used to populate regions of an augmented reality content item template. The product information identifier 426 may include a storage location identifier, such as a link or uniform resource locator (URL).

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the product information identifier(s) 426 may point to data stored within a data structure that includes the product information data table 318. The product information identifier 426 may be analyzed to retrieve information about a product that is stored by the product information data table 318 in order to populate one or more regions indicated by an augmented reality content item template.

Figure 5:
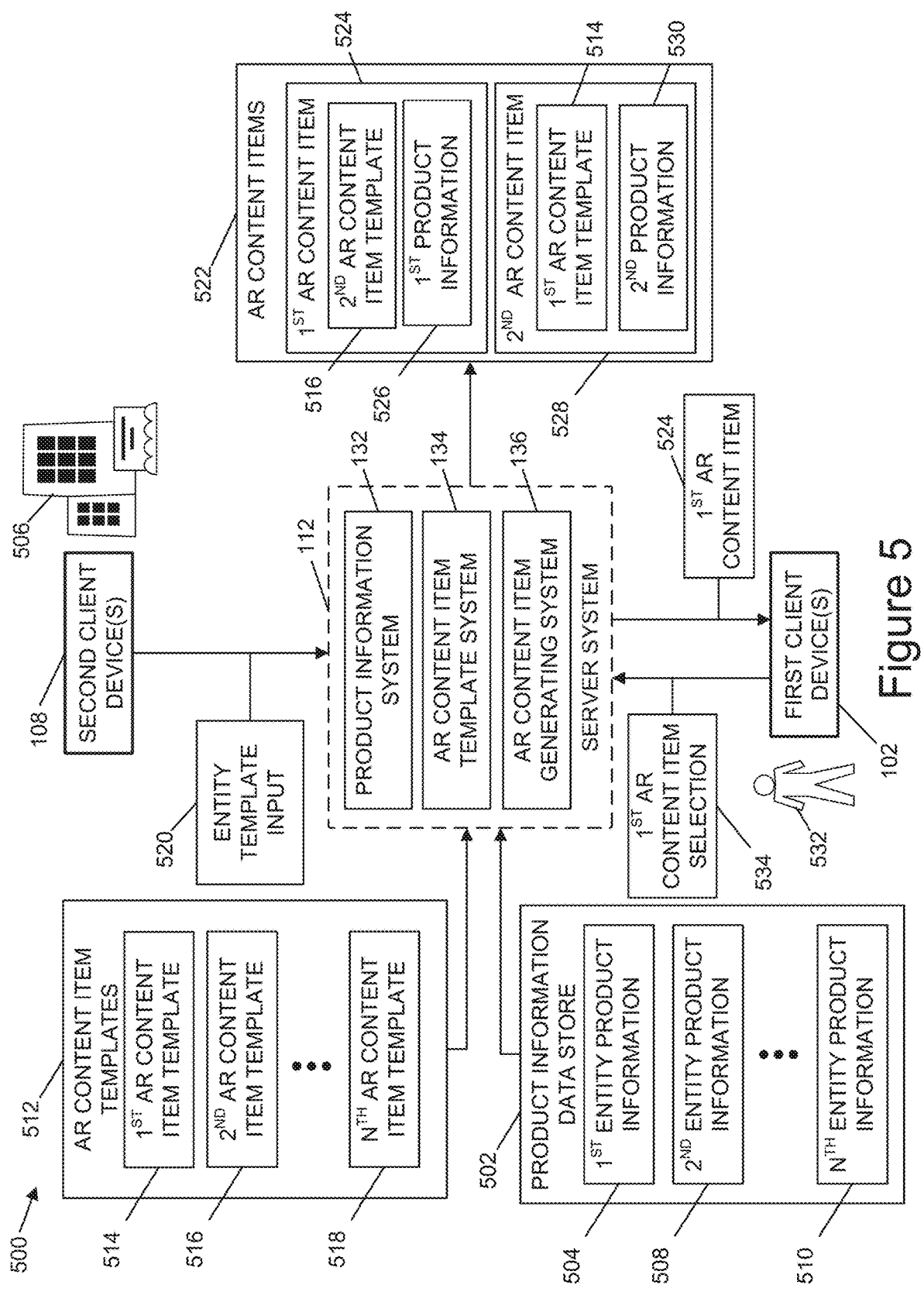
FIG. 5 is a diagrammatic representation illustrating an architecture to generate augmented reality content items using one or more augmented reality content item templates and product information, in accordance with one or more example implementations.

FIG. 5 is a diagrammatic representation illustrating an architecture 500 to generate augmented reality content items using one or more augmented reality content item templates and product information, in accordance with one or more example implementations. The architecture 500 may include the server system 112. The server system 112 may be maintained, administered, or otherwise controlled by a service provider that produces, maintains, or administers the client application 104. The server system 112 may include the product information system 132 to obtain and store information about products offered by entities for purchase by users of the client application 104. The server system 112 may also include the AR content item template system 134 to generate augmented reality content item templates and to determine one or more augmented reality content item templates that may be used to generate augmented reality content items that are executable to display product information. Additionally, the server system 112 may include the AR content item generating system 136 to generate augmented reality content items for products based on one or more augmented reality content item templates.

In addition, the architecture 500 may include a product information data store 502 that is accessible to the server system 112. The product information data store 502 may store information that corresponds to products offered by a number of entities for purchase by users of the client application 104. In various examples, the product information system 132 may obtain product information from a number of entities that is stored by the product information data store 502. In one or more examples, the product information system 132 may provide one or more user interfaces for at least one of capturing product information or uploading product information that is stored by the product information data store 502. In one or more illustrative examples, the product information system 132 may provide a portal by which an entity may provide at least a portion of a product catalog of the entity.

The product information data store 502 may store first entity product information 504 that includes information about products offered by an entity 506 for purchase by users of the client application 104. In one or more implementations, the product information system 132 may obtain the first entity product information 504 from the entity 506. In various examples, the entity 506 may operate one or more second client devices 108 to provide the first entity product information 504 to the product information system 132. In one or more additional examples, the product information system 132 may parse one or more sources of information to obtain the first entity product information 504. The one or more sources of information may include one or more databases of the entity 506. The one or more sources of information may also include one or more websites. In one or more illustrative examples, the product information system 132 may parse one or more websites of the entity 506 and extract product information from the one or more websites. The product information system 132 may analyze information available via one or more sources with respect to at least one of one or more keywords or one or more features to identify information to store as the first entity product information 504. The product information data store 502 may also store product information for a number of other entities, such as the second entity product information 508 up to an Nth entity product information 510.

In one or more examples, the product information system 132 may determine a classification for products having information stored in the product information data store 502. For example, the product information system 132 may generate one or more user interfaces that include one or more user interface elements to capture information indicating a classification of one or more products. In various examples, the classification for a product may be selected from among a number of classifications that are selectable via the one or more user interface elements, such as a drop-down menu or a list of classifications. In addition, the product information system 132 may analyze information about a product to determine a classification of the product. To illustrate, the product information system 132 may analyze one or more characteristics of a product with respect to one or more characteristics of one or more classifications. The product information system 132 may determine a measure of similarity between the one or more characteristics of the product and the one or more characteristics of at least one classification. In situations where the measure of similarity is at least a threshold measure of similarity, the product information system 132 may determine that the classification corresponds to the product.

The architecture 500 may also include augmented reality (AR) content item templates 512 that are accessible to the server system 112. The AR content item templates 512 may include information that may be used to generate augmented reality content items that display content related to one or more products offered for by one or more entities for purchase by users of the client application 104. In various examples, the AR content item templates 512 may indicate regions of a user interface that may display product information obtained from the product information data store 502 with respect to one or more products.

In this way, the AR content item templates 512 may be implemented to customize augmented reality content items according to one or more products that are associated with a respective augmented reality content item. For example, an AR content item template 512 may be used to capture information about a product that may be displayed when a corresponding augmented reality content item is executed. Individual AR content item templates 512 may be used to generate multiple augmented reality content items with each augmented reality content item being executable to display content related to a different product.

In the illustrative example of FIG. 5, the AR content item templates 512 include a first AR content item template 514, a second AR content item template 516, up to an Nth AR content item template 518. In various examples, the individual AR content item templates 514, 516, 518 may correspond to a given classification of products. To illustrate, the first AR content item template 514 may correspond to a first classification of products, the second AR content item template 516 may correspond to a second classification of products, and the Nth AR content item template 518 may correspond to a third classification of products. In this way, the first AR content item template 514 may be used to generate augmented reality content items for products having the first classification, the second AR content item template 516 may be used to generate augmented reality content items for products having the second classification, and the Nth AR content item template 518 may be used to generate augmented reality content items for products having the third classification. In one or more illustrative examples, the first classification may correspond to consumer packaged goods, the second classification may correspond to food and beverage products, and the third classification may correspond to products available via ecommerce platforms.

At least a portion of the one or more regions that are included in the AR content item templates 514, 516, 518 may correspond to different product information. For example, the first AR content item template 514 may include a number of first regions that may display information related to a product and the second AR content item template 516 may include a number of second regions that may display information related to a product. The number of first regions may display a first set of information about a product and the number of second regions may display a second set of information about a product. For example, the first AR content item template 514 may include a region to display a logo of the entity offering a product for sale, a name of the product, and image content related to the product. Additionally, the second AR content item template 516 may include a region to display a name of the product, a region to display an animation including one or more images of the product, and a region to display a slogan related to the product.

Further, individual AR content item templates 512 may be used to generate augmented reality content items that present product information according to different arrangements. In one or more examples, the first AR content item template 514 may include a number of first regions arranged according to a first layout and the second AR content item template 516 may include a number of second regions arranged according to a second layout. Additionally, the regions included in the respective AR content item templates 512 may be related to different types of content, such as text content, image content, video content, graphical content, animation content, one or more combinations thereof, and so forth. In one or more illustrative examples, the first AR content item template 514 may include a first region and a second region that correspond to the display of static image content related to a product and a third region that corresponds to the display of animation content related to the product. Further, the second AR content item template 516 may include a first region that corresponds to the display of text content related to the product and a second region that corresponds to the display of video content related to the product.

In one or more additional examples, individual AR content item templates 512 may correspond to augmented reality content items that display product information according to different animations, such as different motion patterns. To illustrate, the first AR content item template 514 may indicate an animation pattern that shows images of a product revolving around an object and the second AR content item template 516 may indicate an animation pattern that shows images of a product moving along a border of a user interface.

The AR content item template system 134 may generate one or more user interfaces that include one or more user interface elements to capture input that may be used to determine one or more AR content item templates 512 to use to generate augmented reality content items for a product offered by an entity for purchase. In one or more examples, the AR content item template system 134 may generate one or more user interfaces that include one or more user interface elements to capture entity template input 520 from the entity 506. The entity template input 520 may include an identifier of a product for which to generate an augmented reality content item. The identifier may include a name of a product, an alphanumeric identifier of the product, a bar code, a quick response (QR) code, or one or more combinations thereof. In additional examples, the entity template input 520 may include a classification of the product. In various examples, the classification may be selected from a number of classifications that may be selectable via one or more user interface elements.

The AR content item template system 134 may determine one or more AR content item templates 512 related to a product of the entity 506 based on the entity template input 520. For example, the AR content item template system 134 may determine a classification of a product based on the entity template input 520 and determine one or more of the AR content item templates 512 that correspond to the classification. In various examples, the classification may be directly indicated by the entity template input 520, such as in scenarios where the classification is selected from among a number of classifications included in a user interface accessible to the entity 506 via the second client device 108.

In additional examples, the AR content item template system 134 may analyze information related to the product to determine a classification of the product. To illustrate, the AR content item template system 134 may obtain an identifier of a product, such as from the entity template input 520. The AR content item template system 134 may use the identifier of the product to parse the product information data store 502 to obtain information about the product. In one or more examples, the information about the product included in the product information data store 502 may indicate a classification of the product that may be used to determine one or more AR content item templates 512 that may be implemented to generate one or more augmented reality content items related to the product. In one or more further examples, the AR content item template system 134 may parse the information about the product stored by the product information data store 502 to determine one or more features of the product. The one or more features of the product may be analyzed with respect to one or more features that correspond to one or more respective classifications. In various examples, the AR content item template system 134 may determine a measure of similarity between one or more features of the product obtained from the product information data store 502 and one or more features of at least one classification of a classification system. The AR content item template system 134 may determine that a measure of similarity between one or more features of the product and one or more features of a classification is at least a threshold measure of similarity and then determine one or more AR content item templates 512 that correspond to the classification.

In one or more implementations, after determining one or more AR content item templates 512 that correspond to a product offered by the entity 506 for purchase, the AR content item template system 134 may generate one or more user interfaces that correspond to the one or more AR content item templates 512. For example, the AR content item template system 134 may generate a user interface that includes a number of AR content item templates 512 that correspond to a classification of the product and the AR content item template system 134 may obtain input indicating selection of the first AR content item template 514 from among the number of AR content item templates 512. The AR content item template system 134 may then generate a user interface that indicates an arrangement of one or more regions of the first AR content item template 514, where the one or more regions may correspond to information related to the product.

The AR content item template system 134 may parse the product information data store 502 to determine information about the product that corresponds to the one or more regions of the first AR content item template 514. In various examples, the first AR content item template 514 may indicate the product information to be displayed with respect to the one or more regions. For example, the first AR content item template 514 may indicate one or more identifiers, one or more categories, one or more classifiers, or one or more combinations thereof, that correspond to content that is to be displayed with respect to the one or more regions of the first AR content item template 514 that are to display product information. The AR content item template system 134 may then retrieve the information from the product information data store 502 that corresponds to the one or more regions of the first AR content item template 514. In one or more examples, the AR content item template system 134 may generate a preview of an augmented reality content item generated using the first AR content item template 514 with respect to the product by populating the one or more regions with the information about the product that corresponds to the one or more regions that was obtained from the product information data store 502. The preview may also include implementing functionality related to at least one region of the first AR content item template 514, such as displaying an animation or playing video content. In one or more additional examples, the information used to populate at least a portion of the one or more regions of the first AR content item template 514 may be provided by the entity 506 via one or more user interfaces. To illustrate, an image of the product may be provided to the AR content item template system 134 by the entity 506 and the AR content item template system 134 may populate a region of the first AR content item template 514 with the image.

The AR content item generating system 136 may generate one or more augmented reality (AR) content items 522 with respect to products offered by the entity 506 for purchase. For example, the AR content item generating system 136 may generate a first AR content item 524 for a first product based on the second AR content item template 516 and first product information 526. The first AR content item 524 may include computer-executable instructions that are executable to display the first product information 526 according to the arrangement of information and the functionality of the second AR content item template 516. In addition, the AR content item generating system 136 may generate a second AR content item 528 based on the first AR content item template 514 and second product information 530. The second AR content item 528 may include computer-executable instructions that are executable to display the second product information 530 according to the arrangement of information and the functionality of the first AR content item template 514. In various examples, the first AR content item 524 and the second AR content item 528 may individually include a package of data that includes computer-readable instructions and information that may be used to populate one or more regions of the respective content item templates 514, 516 that correspond to the AR content items 524, 528. In one or more examples, the AR content items 524, 528 may indicate storage locations of the first product information 526 and the second product information 530, respectively. In additional examples, the first product information 526 may be included in a data package of the first AR content item 524 and the second product information 530 may be included in a data package of the second AR content item 528.

The AR content items 522 may be accessible to users of the client application 104. In one or more examples, the first client device 102 may be operated by a user 532. The user 532 may have an account with a service provider that produces, maintains, and implements the client application 104. In various examples, the first client device 102 may store and execute an instance of the client application 104. The first client device 102 may also include one or more cameras that may capture at least one of image content or video content. The content captured via the one or more cameras may be user content that may be communicated to other users of the client application 104 via at least one of messaging functionality or social network functionality. The first client device 102 may also include one or more input devices that capture audio content that may correspond to video content captured by one or more cameras of the first client device 102.

In one or more illustrative examples, the first client device 102 may display a user interface that includes content captured via one or more cameras of the first client device 102. The user interface may include a live view of content captured by one or more cameras of the first client device 102 or previously captured content that is accessible to the first client device 102. In various examples, at least a portion of the user content included in the user interface may be stored by memory of the client device 102. In one or more further examples, at least a portion of the user content included in the user interface may be stored in one or more data storage devices that are located remotely with respect to the first client device 102 and accessible to the first client device 102.

The user interface that includes the user content may also include one or more user interface elements that are selectable to execute one or more augmented reality content items. In one or more examples, a user interface that includes user content being displayed by the first client device 102 may include a user interface element that is selectable to execute an augmented reality content item generated using one or more AR content item templates 512 and product information obtained from the product information data store 502. In various examples, the user interface may include a first user interface element that is selectable to execute the first AR content item 524 and a second user interface element that is selectable to execute the second AR content item 528. In the illustrative example of FIG. 5, the user may select the first user interface element corresponding to the first AR content item 524 and a first AR content item selection 534 may be sent to the server system 112. In response to receiving the first AR content item selection 534, the server system 112 may send the first AR content item 524 to the first client device 102. The first client device 102 may execute the first AR content item 524. For example, an instance of the client application 104 executed by the first client device 102 may execute computer-readable instructions of the first AR content item 524 to display the first product information 526 in accordance with an arrangement of the second AR content item template 516. The first product information 526 may be displayed as an overlay with respect to user content included in a user interface displayed by the first client device 102.

In one or more implementations, the user content included in a user interface displayed by the first client device 102 may be modified by executing the first AR content item 524 and modified user content may be generated. The modified user content may include initial user content displayed in a user interface of the client application 104 in addition to the first product information 526 that is displayed in accordance with the arrangement and functionality of the second AR content item template 528. In one or more examples, the modified user content may be further modified via one or more creative tools of the client application 104. Additionally, the modified user content may be communicated to one or more additional users of the client application 104, such as contacts of the user 532, using messaging functionality or social network functionality of the client application 104.

Figure 6:
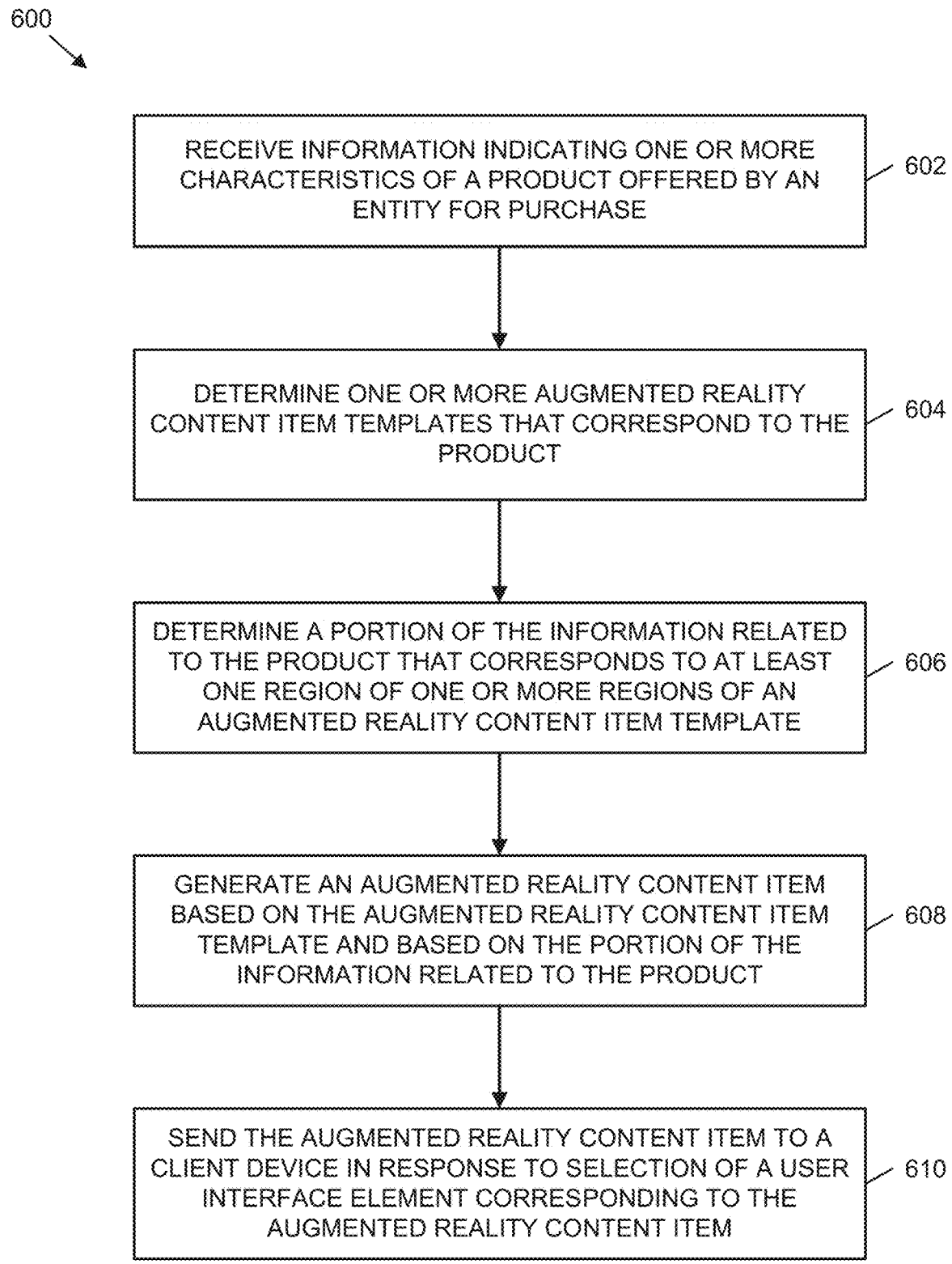
FIG. 6 is a flowchart illustrating example operations of a process to generate augmented reality content items based on one or more augmented reality content item templates, according to one or more example implementations.

FIG. 6 illustrates a flowchart of processes to generate augmented reality content items based on augmented reality content item templates. The processes may be embodied in computer-readable instructions for execution by one or more processors such that the operations of the processes may be performed in part or in whole by the functional components of at least one of the client application 104 or the server system 112. Accordingly, the processes described below are by way of example with reference thereto, in some situations. However, in other implementations, at least some of the operations of the processes described with respect to FIG. 6 may be deployed on various other hardware configurations. The processes described with respect to FIG. 6 are therefore not intended to be limited to the server system 112 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to generate augmented reality content items based on one or more augmented reality content item templates, according to one or more example implementations. At operation 602, the process 600 includes receiving information indicating one or more characteristics of a product offered by an entity for purchase. In one or more examples, the one or more characteristics may be obtained via input captured by one or more user interface elements of one or more user interfaces provided to a computing device of the entity. In one or more additional examples, the one or more characteristics may be included in product information obtained from the entity, such as a product catalog of the entity. In various examples, the product information may be stored in a product information data store.

In addition, at operation 604, the process 600 may include determining one or more augmented reality content item templates that correspond to the product. The one or more augmented reality content item templates may be determined based on a classification of the product according to a classification system. The classification system may include a number of classifications of products offered by one or more entities for purchase by users of the client application. Individual classifications of the classification system may be associated with one or more characteristics of products. In various examples, each classification of the classification system may be associated with a different set of characteristics.

In one or more examples, the classification of the product may be determined based on input obtained from the entity indicating the classification. To illustrate, one or more user interfaces may include one or more user interface elements that may capture input indicating a classification of the product provided by the entity. In various examples, the classification may be selected from among a number of available classifications. In one or more additional examples, the classification of the product may be determined by analyzing the one or more characteristics of the product with respect to one or more characteristics of at least one classification of the classification system.

Further, the process 600 may include, at operation 606, determining a portion of the information related to the product that corresponds to at least one region of one or more regions of an augmented reality content item template. The augmented reality content item template may be selected from among the one or more augmented reality content item templates associated with the classification of the product. In one or more examples, the augmented reality content item template may be selected via a user interface element of a user interface that displays the one or more user interface elements associated with the classification of the product. The portion of the information related to the product that corresponds to the at least one region may be determined based on information corresponding to the at least one region indicating one or more criteria to be used to identify information that may be displayed with respect to the at least one region. The one or more criteria may indicate types of data, features of data, or identifiers of data that may be displayed with respect to the at least one region. In one or more additional examples, information related to the product may be analyzed with respect to the one or more criteria associated with the at least one region to identify the portion of the information related to the product to display with respect to the at least one region. In one or more illustrative examples, the augmented reality content item template may indicate that a logo of the entity is to be displayed with respect to the at least one region. In these scenarios, the logo of the entity may be obtained from the product information.

At operation 608, the process 600 may include generating an augmented reality content item based on the augmented reality content item template and based on the portion of the information related to the product. The augmented reality content item may include a data package that includes computer-readable instructions that are executable to display product information with respect to an arrangement of the augmented reality content item template. The augmented reality content item template may also include the portion of the information related to the product that is to be displayed in response to executing the computer-readable instructions of the augmented reality content item. In various examples, the augmented reality content item may include an identifier indicating a storage location from which the portion of the information related to the product may be retrieved. The augmented reality content item may also include computer-readable instructions that are executable to cause one or more functions to be performed with respect to the product information, such as causing the product information to appear as an animation or cause the product information to be displayed in accordance with a set of movements indicated by the augmented reality content item template.

The process 600 may include, at operation 610, sending the augmented reality content item to a client device in response to selection of a user interface element corresponding to the augmented reality content item. In one or more examples, a number of user interface elements that each correspond to an augmented reality content item may be displayed by an instance of the client application executed by the client device. A selection of the user interface element corresponding to the augmented reality content item from among the number of user interface elements may cause the augmented reality content item to be sent to the client device. Additionally, the augmented reality content item may be executed by the client device to modify user content captured by the client device. In various examples, the user content may be modified by displaying the portion of the product information corresponding to the at least one region of the augmented reality content item template in relation to the user content.

Figure 7:
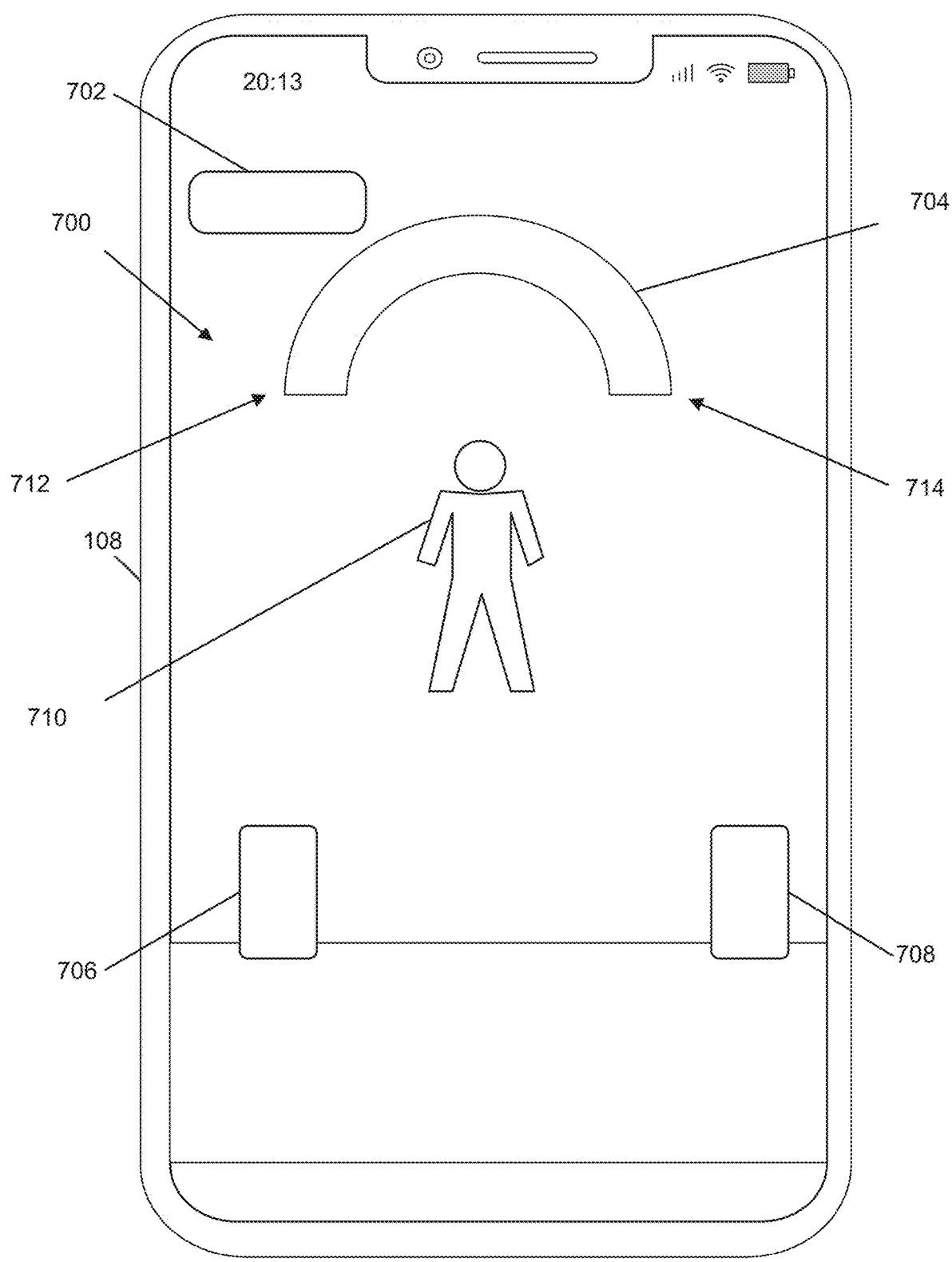
FIG. 7 is an illustration of a user interface that includes an augmented reality content item template indicating a number of regions to display product information, according to one or more example implementations.

FIG. 7 is an illustration of a user interface 700 that includes an augmented reality content item template indicating a number of regions to display product information, according to one or more example implementations. The user interface 700 may be displayed by a display device of a second client device 108 that is associated with an entity offering products for purchase to users of a client application. For example, the user interface 700 may include a first region 702 of an augmented reality content item template to display first product information and a second region 704 of the augmented reality content item template to display second product information. In addition, the user interface 700 may include a third region 706 of the augmented reality content item template to display third product information and a fourth region 708 of the augmented reality content item template to display fourth product information. In various examples, the regions 702, 704, 706, 708 may be displayed in relation to an object 710. The object 710 may indicate a location of at least a portion of user content that may be modified according to an augmented reality content item generated based on the augmented reality content item template. In one or more illustrative examples, the regions 702, 706, 708 may correspond to product information that maintains its location with the user interface 700. In addition, the second region 704 may indicate product information that may change location within the user interface 700 or be related to an animation that is presented with the user interface 700. In the illustrative example of FIG. 7, product information displayed with the second region 704 may move from a first end 712 of the second region 704 to a second end 714 of the second region 704. In various examples, although the regions 702, 704, 706, 708 are represented by bounded items within the user interface 700, the location of product information displayed with respect to the regions 702, 704, 706, 708, may be within or outside of the bounded items, such that the regions 702, 704, 706, 708 may represent an approximate location of product information, in at least some implementations.

Figure 8:
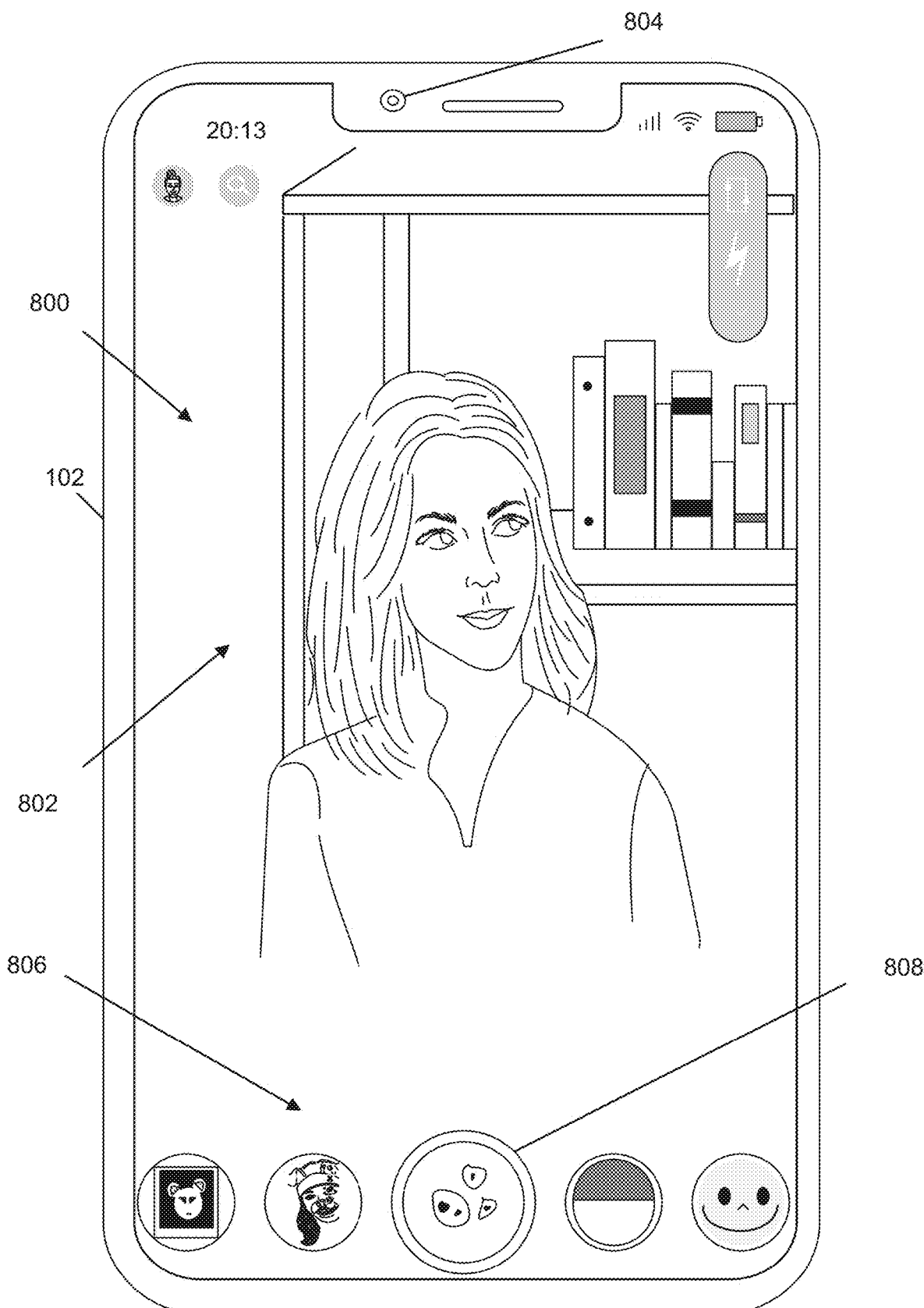
FIG. 8 is an illustration of a user interface that includes user content captured by one or more cameras of a client device, according to one or more example implementations.

FIG. 8 is an illustration of a user interface 800 that includes user content 802 captured by one or more cameras 804 of a first client device 102, according to one or more example implementations. In addition, the user interface 800 may be displayed by a client application, such as the client application 104, that includes at least one of messaging functionality or social networking functionality. In one or more examples, the user interface 800 may include user content 802 that is captured within a field of view of the at least one camera 804 of the first client device 102. In various examples, the user content 802 may include live content that is being captured by the at least one camera 804 of the first client device 102. The user interface 800 may also include a group of user interface elements 806. The group of user interface elements 806 may each be selectable to execute a respective augmented reality content item. In the illustrative example of FIG. 8, the group of user interface elements 806 may include a user interface element 808 that is selectable to execute an augmented reality content item that displays product information in relation to the user content 802.

Figure 9:
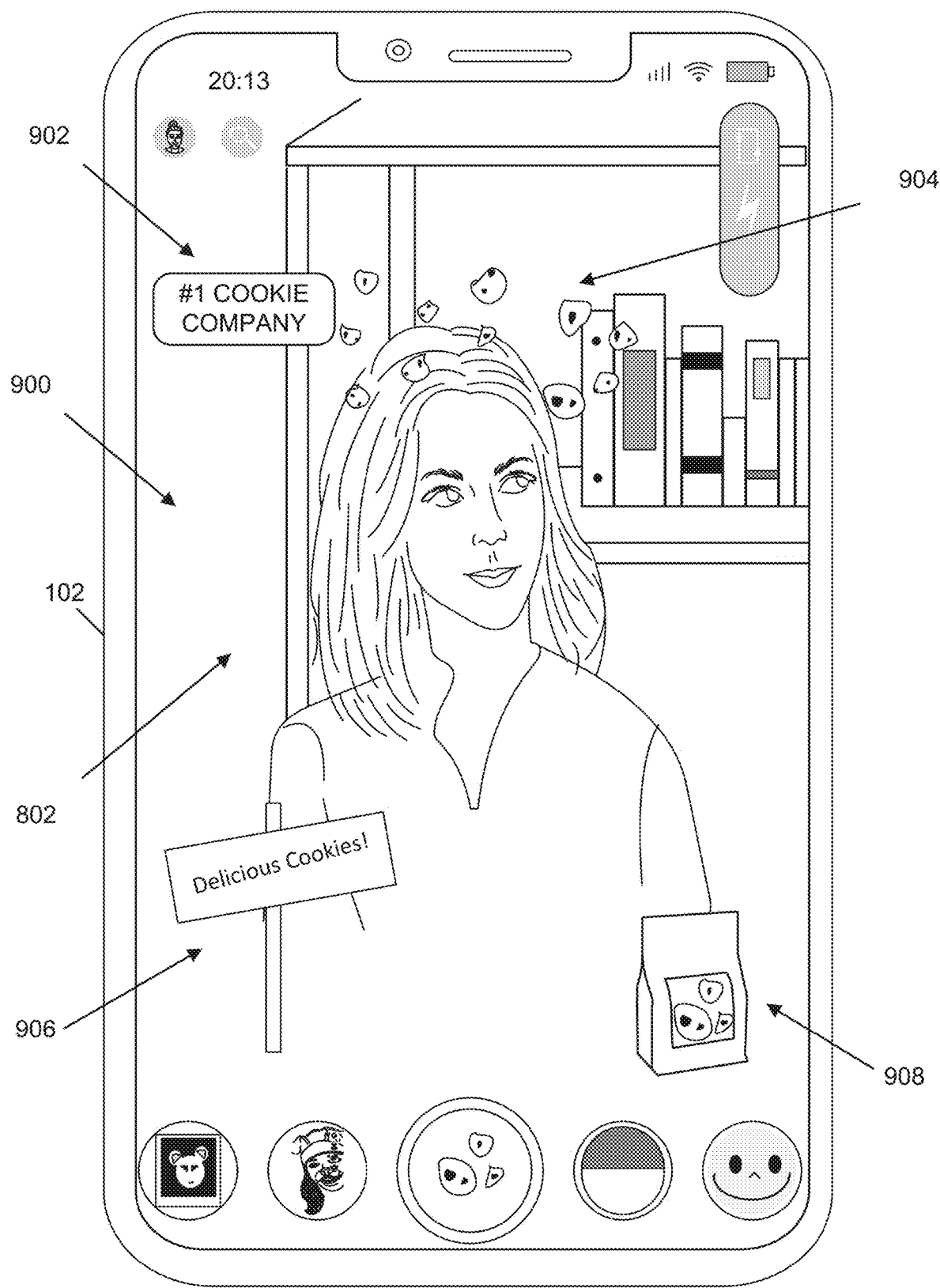
FIG. 9 is an illustration of a user interface that includes a modified version of the user content of FIG. 8 that includes product information displayed according to the augmented reality content item template of FIG. 7, according to one or more example implementations.

FIG. 9 is an illustration of a user interface 900 that includes a modified version of the user content 802 of FIG. 8 that includes product information displayed according to the augmented reality content item template of FIG. 7, according to one or more example implementations. For example, the user interface 900 includes first product information 902 that corresponds to a name of an entity offering a product for purchase by users of a client application. The user interface 900 may also include second product information 904 that includes images of the product being offered for purchase by the entity. In one or more examples, the second product information 904 may include animated content where items included in the second product information 904 move in relation to the head of the individual included in the user content 802. The user interface 900 may also include third product information 906 indicating a slogan related to the product and fourth product information 908 indicating static image content related to the product. In various examples, the user interface 900 may be displayed in response to selection of the user interface element 808 of FIG. 8.

Figure 10:
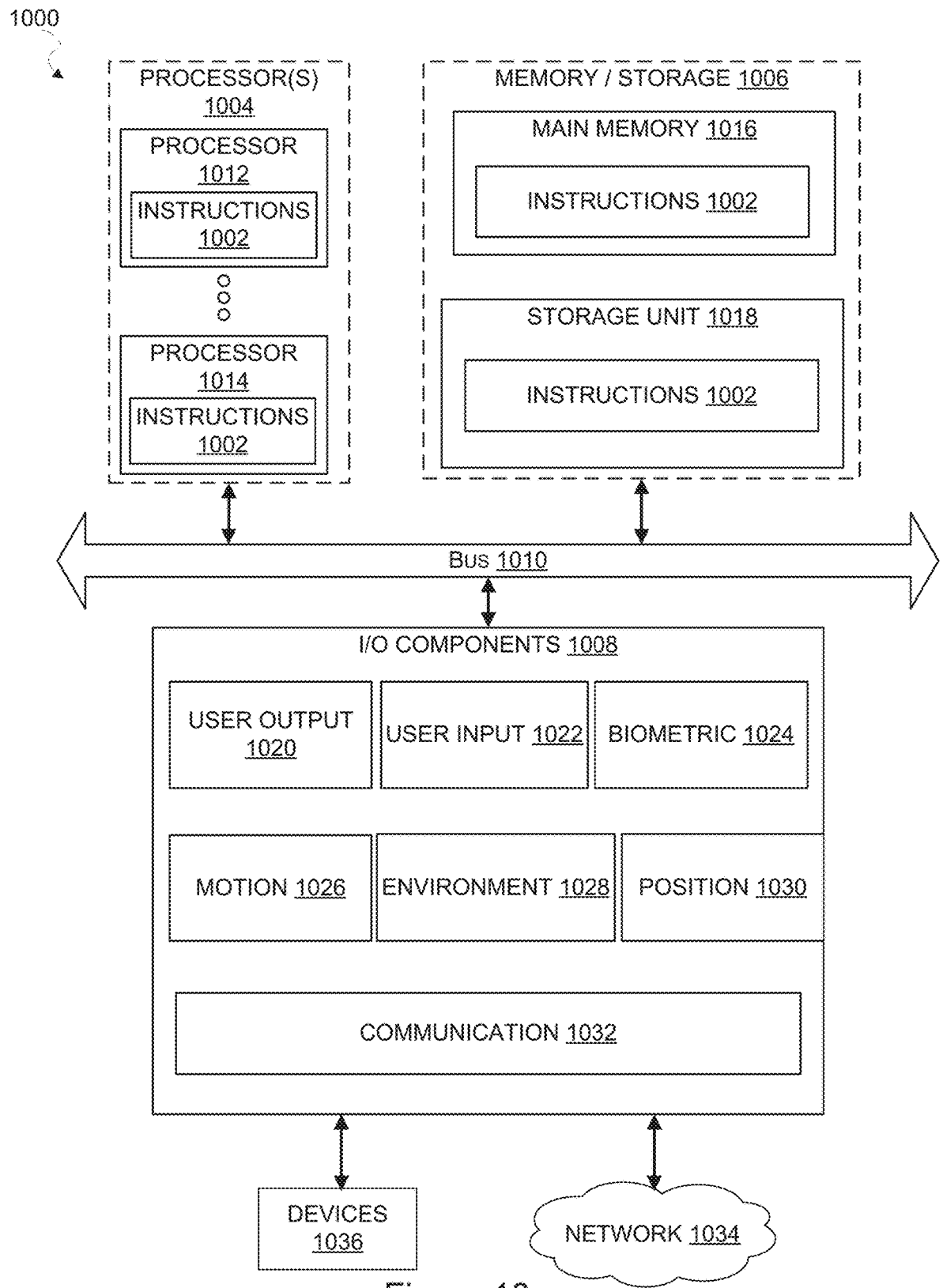
FIG. 10 is a block diagram illustrating components of a machine, in the form of a computer system, that may read and execute instructions from one or more machine-readable media to perform any one or more methodologies described herein, in accordance with one or more example implementations.

FIG. 10 is a block diagram illustrating components of a machine 1000, according to some example implementations, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1002 (e.g., software, a program, an application, an applet, an app, or other executable code) for causing the machine 1000 to perform any one or more of the methodologies discussed herein may be executed. As such, the instructions 1002 may be used to implement modules or components described herein. The instructions 1002 transform the general, non-programmed machine 1000 into a particular machine 1000 programmed to carry out the described and illustrated functions in the manner described. In alternative implementations, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by machine 1000. Further, while only a single machine 1000 is illustrated, the term "machine" shall also be taken to include a collection of machines that individually or jointly execute the instructions 1002 to perform any one or more of the methodologies discussed herein.

The machine 1000 may include processors 1004, memory/storage 1006, and I/O components 1008, which may be configured to communicate with each other such as via a bus 1010. In an example implementation, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1002. The term "processor" is intended to include multi-core processors 1004 that may comprise two or more independent processors (sometimes referred to as "cores") that may execute instructions 1002 contemporaneously. Although FIG. 10 shows multiple processors 1004, the machine 1000 may include a single processor 1012 with a single core, a single processor 1012 with multiple cores (e.g., a multi-core processor), multiple processors 1012, 1014 with a single core, multiple processors 1012, 1014 with multiple cores, or any combination thereof.

The memory/storage 1006 may include memory, such as a main memory 1016, or other memory storage, and a storage unit 1018, both accessible to the processors 1004 such as via the bus 1010. The storage unit 1018 and main memory 1016 store the instructions 1002 embodying any one or more of the methodologies or functions described herein. The instructions 1002 may also reside, completely or partially, within the main memory 1016, within the storage unit 1018, within at least one of the processors 1004 (e.g., within the processor's cache memory), or any suitable combination thereof, during execution thereof by the machine 1000. Accordingly, the main memory 1016, the storage unit 1018, and the memory of processors 1004 are examples of machine-readable media.

The I/O components 1008 may include a wide variety of components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example implementations, the I/O components 1008 may include user output components 1020 and user input components 1022. The user output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1008 may include biometric components 1024, motion components 1026, environmental components 1028, or position components 1030 among a wide array of other components. For example, the biometric components 1024 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1026 may include acceleration sensor components (e.g., accelerometer), gravitation sensor components, rotation sensor components (e.g., gyroscope), and so forth.

The environmental components 1028 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1030 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 may include communication components 1032 operable to couple the machine 1000 to a network 1034 or devices 1036. For example, the communication components 1032 may include a network interface component or other suitable device to interface with the network 1034. In further examples, communication components 1032 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1036 may be another machine 1000 or any of a wide variety of peripheral devices (e.g., a peripheral device coupled via a USB).

Moreover, the communication components 1032 may detect identifiers or include components operable to detect identifiers. For example, the communication components 1032 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1032, such as location via Internet Protocol (IP) geo-location, location via Wi-Fi® signal triangulation, location via detecting an NFC beacon signal that may indicate a particular location, and so forth.

Figure 11:
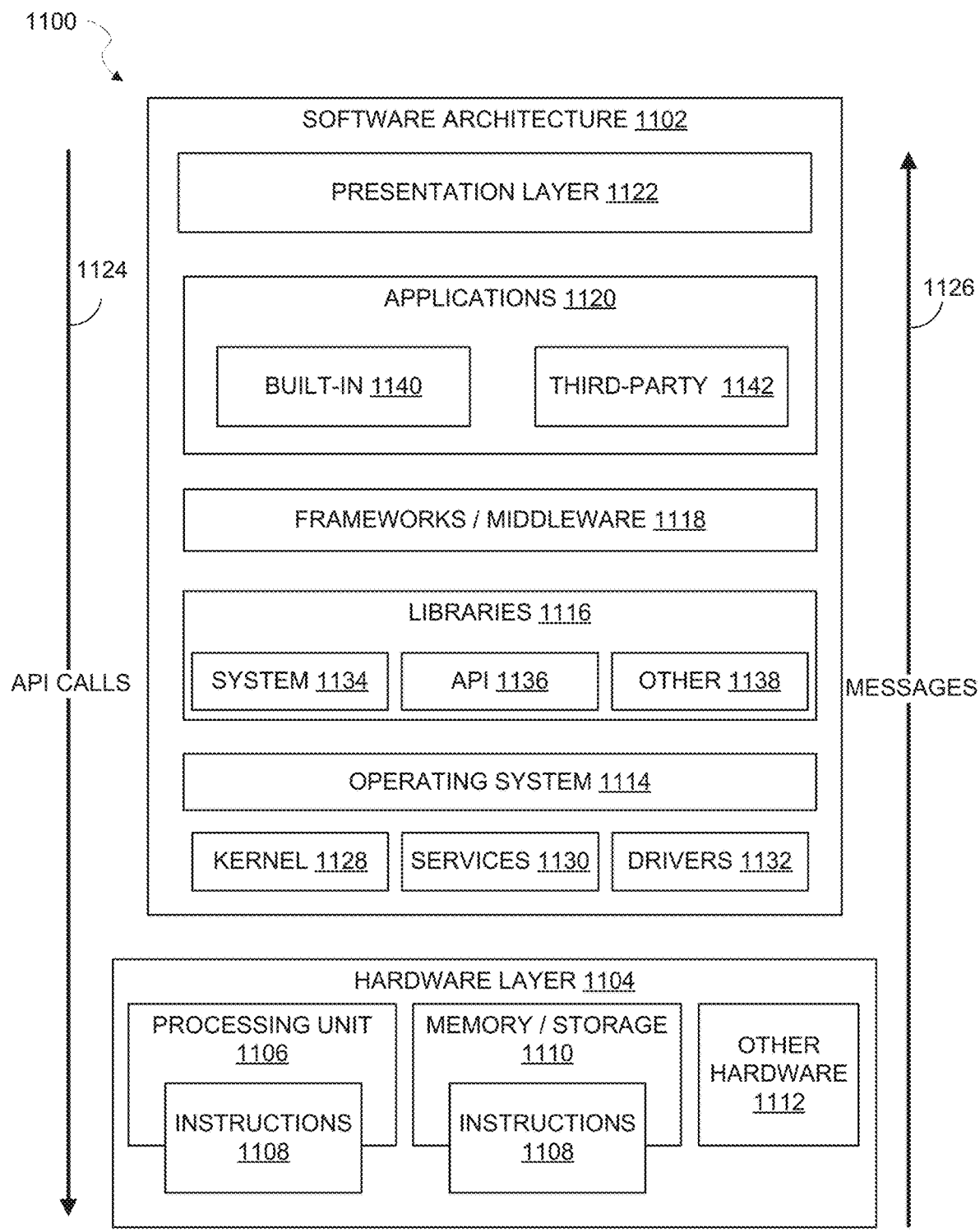
FIG. 11 is block diagram illustrating a representative software architecture that may be used in conjunction with one or more hardware architectures described herein, in accordance with one or more example implementations.

FIG. 11 is a block diagram illustrating system 1100 that includes an example software architecture 1102, which may be used in conjunction with various hardware architectures herein described. FIG. 11 is a non-limiting example of a software architecture and it will be appreciated that many other architectures may be implemented to facilitate the functionality described herein. The software architecture 1102 may execute on hardware such as machine 1000 of FIG. 10 that includes, among other things, processors 1004, memory/storage 1006, and input/output (I/O) components 1008. A representative hardware layer 1104 is illustrated and can represent, for example, the machine 1000 of FIG. 10. The representative hardware layer 1104 includes a processing unit 1106 having associated executable instructions 1108. Executable instructions 1108 represent the executable instructions of the software architecture 1102, including implementation of the methods, components, and so forth described herein. The hardware layer 1140 also includes at least one of memory or storage modules memory/storage 1110, which also have executable instructions 1108. The hardware layer 1104 may also comprise other hardware 1112.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1122. Operationally, the applications 1120 or other components within the layers may invoke API calls 1124 through the software stack and receive messages 1126 in response to the API calls 1124. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 are responsible for controlling or interfacing with the underlying hardware. For instance, the drivers 1132 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 provide a common infrastructure that is used by at least one of the applications 1120, other components, or layers. The libraries 1116 provide functionality that allows other software components to perform tasks in an easier fashion than to interface directly with the underlying operating system 1114 functionality (e.g., kernel 1128, services 1130, drivers 1132). The libraries 1116 may include system libraries 1134 (e.g., C standard library) that may provide functions such as memory allocation functions, string manipulation functions, mathematical functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as middleware) provide a higher-level common infrastructure that may be used by the applications 1120 or other software components/modules. For example, the frameworks/middleware 1118 may provide various graphical user interface functions, high-level resource management, high-level location services, and so forth. The frameworks/middleware 1118 may provide a broad spectrum of other APIs that may be utilized by the applications 1120 or other software components/modules, some of which may be specific to a particular operating system 1114 or platform.

The applications 1120 include built-in applications 1140 and third-party applications 1142. Examples of representative built-in applications 1140 may include, but are not limited to, a contacts application, a browser application, a book reader application, a location application, a media application, a messaging application, or a game application. Third-party applications 1142 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1142 may invoke the API calls 1124 provided by the mobile operating system (such as operating system 1114) to facilitate functionality described herein.

The applications 1120 may use built-in operating system functions (e.g., kernel 1128, services 1130, drivers 1132), libraries 1116, and frameworks/middleware 1118 to create UIs to interact with users of the system. Alternatively, or additionally, in some systems, interactions with a user may occur through a presentation layer, such as presentation layer 1122. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1002 for execution by the machine 1000, and includes digital or analog communications signals or other intangible medium to facilitate communication of such instructions 1002. Instructions 1002 may be transmitted or received over the network 114, 1034 using a transitory or non-transitory transmission medium via a network interface device and using any one of a number of well-known transfer protocols.

"CLIENT DEVICE," in this context, refers to any machine 1000 that interfaces to a communications network 114, 1034 to obtain resources from one or more server systems or other client devices 102, 108. A client device 102, 108 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 114, 1034.

"COMMUNICATIONS NETWORK," in this context, refers to one or more portions of a network 114, 1034 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 114, 1034 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1002 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1002. The term "machine-readable medium" shall also be taken to include any medium, or combination of multiple media, that is capable of storing instructions 1002 (e.g., code) for execution by a machine 1000, such that the instructions 1002, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor 1012, 1014 or processors 1004, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor 1012, 1014 or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 114 (e.g., the Internet) and via one or more appropriate interfaces (e.g., an API). The performance of certain of the operations may be distributed among the processors, not only residing within a single machine 1000, but deployed across a number of machines. In some example implementations, the processors 1004 or processor-implemented components may be located in a single geographic location (e.g., within a home environment, an office environment, or a server farm). In other example implementations, the processors 1004 or processor-implemented components may be distributed across a number of geographic locations.

"PROCESSOR," in this context, refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may, for example, be a CPU, a RISC processor, a CISC processor, a GPU, a DSP, an ASIC, a RFIC or any combination thereof. A processor 1004 may further be a multi-core processor having two or more independent processors 1004 (sometimes referred to as "cores") that may execute instructions 1002 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:
1. A method comprising:
  generating, by one or more computing devices that each include a processor and memory, an augmented reality content item template that corresponds to a classification of products offered for purchase by a group of entities, the augmented reality content item template corresponding to an arrangement of a number of regions to display a set of information related to the products;
  causing, by at least one computing device of the one or more computing devices, display of a first user interface including a first user interface element to capture template input, the template input indicating an identifier of a product offered for purchase by an entity;
  parsing, by the at least one computing device of the one or more computing devices and in response to receiving the template input, a product information data store to obtain information about the product;
  responsive to obtaining the information about the product, analyzing, by the at least one computing device of the one or more computing devices, the information about the product to determine that the classification corresponds to the product;
  responsive to determining that the classification corresponds to the product, causing, by the at least one computing device of the one or more computing devices, display of a second user interface that includes one or more additional user interface elements that corresponds to a selection of the augmented reality content item template from among a plurality of content item templates that correspond to the classification;

determining, by the at least one computing device of the one or more computing devices, information included in the set of information related to the product that corresponds to a first region and a second region of the augmented reality content item template, wherein the first region corresponds to static content included in the set of information related to the product and the second region corresponds to animated content included in the set of information related to the product;

generating, by the at least one computing device of the one or more computing devices, an augmented reality content item based on the augmented reality content item template and based on the set of information related to the product, the augmented reality content item causing display of the set of information related to the product in the number of regions in relation to user content generated by a client application;

generating, by the at least one computing device of the one or more computing devices, a data package that includes (i) a storage location identifier to retrieve the static content and the animated content in conjunction with execution of the augmented reality content item and (ii) computer-readable instructions of the augmented reality content item causing display of a third user interface that includes at least one of image content or video content captured by a camera, the static content displayed in relation to the first region of the augmented reality content item template, and the animated content displayed in relation to the second region of the augmented reality content item template; and sending, by the at least one computing device of the one or more computing devices, the data package to a client device executing an instance of the client application in response to selection of a second user interface element corresponding to the augmented reality content item.

2. The method of claim 1, further comprising:

obtaining, by the at least one computing device of the one or more computing devices, a product catalog including at least a portion of the information about the product, the product catalog corresponding to one or more products offered by the entity for purchase, the product catalog indicating one or more characteristics of individual products of the one or more products and the product being included in the one or more products; and determining, by the at least one computing device of the one or more computing devices, that the product corresponds to the classification based on at least one characteristic of the product included in the product catalog.

3. The method of claim 2, wherein:

the classification is one classification of a plurality of classifications of a classification system of products offered for purchase by one or more entities of the group of entities; and individual classifications of the classification system correspond to a group of augmented reality content item templates to generate augmented reality content items for products included in the individual classifications.

4. The method of claim 2, further comprising:

extracting, by the at least one computing device of the one or more computing devices, the information about the product from the product catalog to populate the first region of the augmented reality content item template.

5. The method of claim 1, wherein the augmented reality content item is executed with respect to a message sent between users of the client application.

6. The method of claim 1, further comprising generating, by the at least one computing device of the one or more computing devices, a preview of the third user interface that includes the first region populated by the static content and the second region populated by the animated content, wherein the preview is accessible to a computing device of the entity offering the product for purchase.

7. The method of claim 1, wherein the at least one of image content or video content captured by the camera includes a live view captured by the client device.

8. A system comprising:

one or more hardware processors; and one or more non-transitory computer-readable storage media including computer-readable instructions that, when executed by the one or more hardware processors, cause the one or more hardware processors to perform operations comprising:

generating an augmented reality content item template that corresponds to a classification of products offered for purchase by a group of entities, the augmented reality content item template corresponding to an arrangement of a number of regions to display a set of information related to the products;

causing display of a first user interface including a first user interface element to capture template input, the template input indicating an identifier of a product offered for purchase by an entity;

parsing, in response to receiving the template input, a product information data store to obtain information about the product;

responsive to obtaining the information about the product, analyzing the information about the product to determine that the classification corresponds to the product;

responsive to determining that the classification corresponds to the product, causing display of a second user interface that includes one or more additional user interface elements that corresponds to a selection of the augmented reality content item template from among a plurality of content item templates that correspond to the classification;

determining information included in the set of information related to the product that corresponds to a first region and a second region of the augmented reality content item template, wherein the first region corresponds to static content included in the set of information related to the product and the second region corresponds to animated content included in the set of information related to the product;

generating an augmented reality content item based on the augmented reality content item template and based on the set of information related to the product, the augmented reality content item being executable to display the set of information related to the product in the number of regions in relation to user content generated by a client application;

generating a data package that includes (i) a storage location identifier to retrieve the static content and the animated content in conjunction with execution of the augmented reality content item and (ii) computer-readable instructions of the augmented reality content item that are executable to cause display of a third user interface that includes at least one of image content or video content captured by a camera, the static content displayed in relation to the first region of the augmented reality content item template, and the animated content displayed in relation to the second region of the augmented reality content item template; and sending the data package to a client device executing an instance of the client application in response to selection of a second user interface element corresponding to the augmented reality content item.

9. The system of claim 8, wherein
the augmented reality content item template is determined based on the classification.

10. The system of claim 9, wherein:
the classification is one classification of a plurality of classifications for products available for purchase by users of the client application; and
individual classifications of the plurality of classifications are associated with one or more respective augmented reality content item templates.

11. The system of claim 10, wherein:
the arrangement of the number of regions indicates the second region to display the animated content item;
an additional augmented reality content item template corresponds to a second classification of the plurality of classifications; and
an additional arrangement of an additional number of regions indicates a third region to display the animated content item, the third region being different from the second region.

12. The system of claim 11, wherein the one or more non-transitory computer-readable storage media including additional computer-readable instructions that, when executed by the one or more hardware processors, cause the one or more hardware processors to perform additional operations comprising:
performing a first analysis of first product information of the plurality of products to determine that a first portion of the plurality of products corresponds to a first classification; and
performing a second analysis of second product information of the plurality of products to determine that a second portion of the plurality of products corresponds to the second classification.

13. The system of claim 12, wherein the one or more non-transitory computer-readable storage media including additional computer-readable instructions that, when executed by the one or more hardware processors, cause the one or more hardware processors to perform additional operations comprising:
determining one or more first characteristics of a first product included in the plurality of products;
analyzing the one or more first characteristics with respect to one or more first features corresponding to the first classification to determine a first measure of similarity between the one or more first characteristics and the one or more first features; and
determining that the first product corresponds to the first classification based on the first measure of similarity being at least a threshold measure of similarity.

14. The system of claim 13, wherein the one or more non-transitory computer-readable storage media including additional computer-readable instructions that, when executed by the one or more hardware processors, cause the one or more hardware processors to perform additional operations comprising:
determining one or more second characteristics of a second product included in the plurality of products;
analyzing the one or more second characteristics with respect to one or more second features corresponding to the second classification to determine a second measure of similarity between the one or more second characteristics and the one or more second features; and
determining that the second product corresponds to the second classification based on the second measure of similarity being at least the threshold measure of similarity.

15. The system of claim 12, wherein:
performing the first analysis includes identifying one or more first keywords included in the first product information that corresponds to the first classification to determine that the first portion of the plurality of products corresponds to the first classification; and
performing the second analysis includes identifying one or more second keywords included in the second product information that corresponds to the second classification to determine that the second portion of the plurality of products corresponds to the second classification.

16. The system of claim 8, wherein the one or more non-transitory computer-readable storage media including additional computer-readable instructions that, when executed by the one or more hardware processors, cause the one or more hardware processors to perform additional operations comprising:
parsing the product information data store to identify the set of information based on one or more criteria; and
extracting the set of information from a product catalog corresponding to the product and associating the set of information with a region of the augmented reality content item template.

17. The system of claim 8, wherein the animated content includes images of the product revolving around an object included in a content item or images of the product moving along a border of the third user interface.

18. One or more non-transitory computer-readable storage media including computer-readable instructions that, when executed by one or more hardware processors, cause the one or more hardware processors to perform operations comprising:
generating an augmented reality content item template that corresponds to a classification of products offered for purchase by a group of entities, the augmented reality content item template corresponding to an arrangement of a number of regions to display a set of information related to the products;
causing display of a first user interface including a first user interface element to capture template input, the template input indicating an identifier of a product offered for purchase by an entity;
parsing, in response to receiving the template input, a product information data store to obtain information about the product;
responsive to obtaining the information about the product, analyzing the information about the product to determine that the classification corresponds to the product;
responsive to determining that the classification corresponds to the product, causing display of a second user interface that includes one or more additional user interface elements that corresponds to a selection of the augmented reality content item template from among a plurality of content item templates that correspond to the classification;
determining information included in the set of information related to the product that corresponds to a first region and a second region of the augmented reality content item template, wherein the first region corresponds to static content included in the set of information related to the product and the second region corresponds to animated content included in the set of information related to the product;

generating an augmented reality content item based on the augmented reality content item template and based on the set of information related to the product, the augmented reality content item being executable to display the set of information related to the product in the number of regions in relation to user content generated by a client application;

generating a data package that includes (i) a storage location identifier to retrieve the static content and the animated content in conjunction with execution of the augmented reality content item and (ii) computer-readable instructions of the augmented reality content item that are executable to cause display of a third user interface that includes at least one of image content or video content captured by a camera, the static content displayed in relation to the first region of the augmented reality content item template, and the animated content displayed in relation to the second region of the augmented reality content item template; and sending the data package to a client device executing an instance of the client application in response to selection of a second user interface element corresponding to the augmented reality content item.

19. The one or more non-transitory computer-readable storage media of claim 18, further comprising additional computer-readable instructions that, when executed by the one or more hardware processors, cause the one or more hardware processors to perform additional operations comprising:

generating one or more user interfaces of a portal that is accessible to the group of entities, the one or more user interfaces including entity user interface elements to capture product information of one or more products offered for purchase by the group of entities and to capture information used to determine augmented reality content item templates that correspond to the one or more products.

20. The one or more non-transitory computer-readable storage media of claim 18, further comprising additional computer-readable instructions that, when executed by the one or more hardware processors, cause the one or more hardware processors to perform additional operations comprising:

generating a plurality of augmented reality content items based on one or more augmented reality content item templates, individual augmented reality content items of the plurality of augmented reality content items corresponding to one or more products; and making the plurality of augmented reality content items available to users of the client application such that a respective user interface element corresponding to the individual augmented reality content items is displayed in at least one user interface accessible via the client application.

* * * * *